US007496655B2

(12) United States Patent
Gopalan et al.

(10) Patent No.: US 7,496,655 B2
(45) Date of Patent: Feb. 24, 2009

(54) SYSTEM AND METHOD FOR STATIC AND DYNAMIC LOAD ANALYSES OF COMMUNICATION NETWORK

(75) Inventors: Srividya Gopalan, Bangalore (IN); Kanchan Sripathy, Bangalore (IN); V. Sridhar, Bangalore (IN); K. Kalyana Rao, Bangalore (IN)

(73) Assignee: Satyam Computer Services Limited of Mayfair Centre, Secunderabad (IN)

( * ) Notice: Subject to any disclaimer, the term of this patent is extended or adjusted under 35 U.S.C. 154(b) by 520 days.

(21) Appl. No.: 10/135,676

(22) Filed: May 1, 2002

(65) Prior Publication Data

US 2003/0208523 A1 Nov. 6, 2003

(51) Int. Cl.
G06F 15/173 (2006.01)
H04L 12/28 (2006.01)
(52) U.S. Cl. .................... 709/224; 709/224; 370/395.43
(58) Field of Classification Search ......... 709/216–226; 370/229–240, 395.21–395.43
See application file for complete search history.

(56) References Cited

U.S. PATENT DOCUMENTS

| | | | | |
|---|---|---|---|---|
| 5,893,905 | A * | 4/1999 | Main et al. ..................... | 705/11 |
| 6,125,105 | A * | 9/2000 | Edwards et al. ............. | 370/230 |
| 6,147,975 | A | 11/2000 | Bowman-Amuah | |
| 6,272,110 | B1 | 8/2001 | Tunnicliffe et al. | |
| 6,678,250 | B1 * | 1/2004 | Grabelsky et al. ........... | 370/241 |
| 2001/0039582 | A1 * | 11/2001 | McKinnon et al. .......... | 709/226 |
| 2003/0225549 | A1 * | 12/2003 | Shay et al. .................. | 702/182 |
| 2004/0098457 | A1 * | 5/2004 | Betge-Brezetz et al. ..... | 709/204 |
| 2004/0153563 | A1 * | 8/2004 | Shay et al. .................. | 709/232 |

OTHER PUBLICATIONS

CondorIS.Net Technical Term Glossary, Aug. 30, 1999.*
Bouillet et al., "Design Assisted, Real Time, Measurement-Based Network Controls for Management of Service Level Agreements", Eurandom W'shop on Stochastics of Integrated-Services Comm. Networks, Eindhoven, The Netherlands, Nov. 15, 1999, pp. 1-10.
Wolski et al., "The Network Weather Service: A Distributed Resource Performance Forecasting Service for Metacomputing", Journal of Future Generation Computing Systems, vol. 15, pp. 1-19.

* cited by examiner

Primary Examiner—Yasin M Barqadle
(74) Attorney, Agent, or Firm—Venable LLP; Catherine M. Voorhees

(57) ABSTRACT

The proposed system defines a predictive real-time Service Level Agreements (SLAs) monitoring system by (a) a detailed analysis of traffic flows with reduced monitor-data flow across network; and (b) a suitable combination of offline and real-time processing of historical and current traffic data. In order to be able to undertake a detailed analysis without significantly impacting the network throughput, the system analyzes the historical traffic patterns of a typical Provider's network to determine a set of critical SLAs. An in-depth analysis of traffic is performed by creating a unique network parent probe for every critical SLA and the parent probe spawns an optimal number of intelligent master and slave probes based on a regionalization procedure. The online overload monitoring system analyzes the gathered data from the master and slave probes to (a) forecast future violations of the SLA under consideration based on multiple forecast models and (b) generate operator SLA violation alarms.

10 Claims, 29 Drawing Sheets

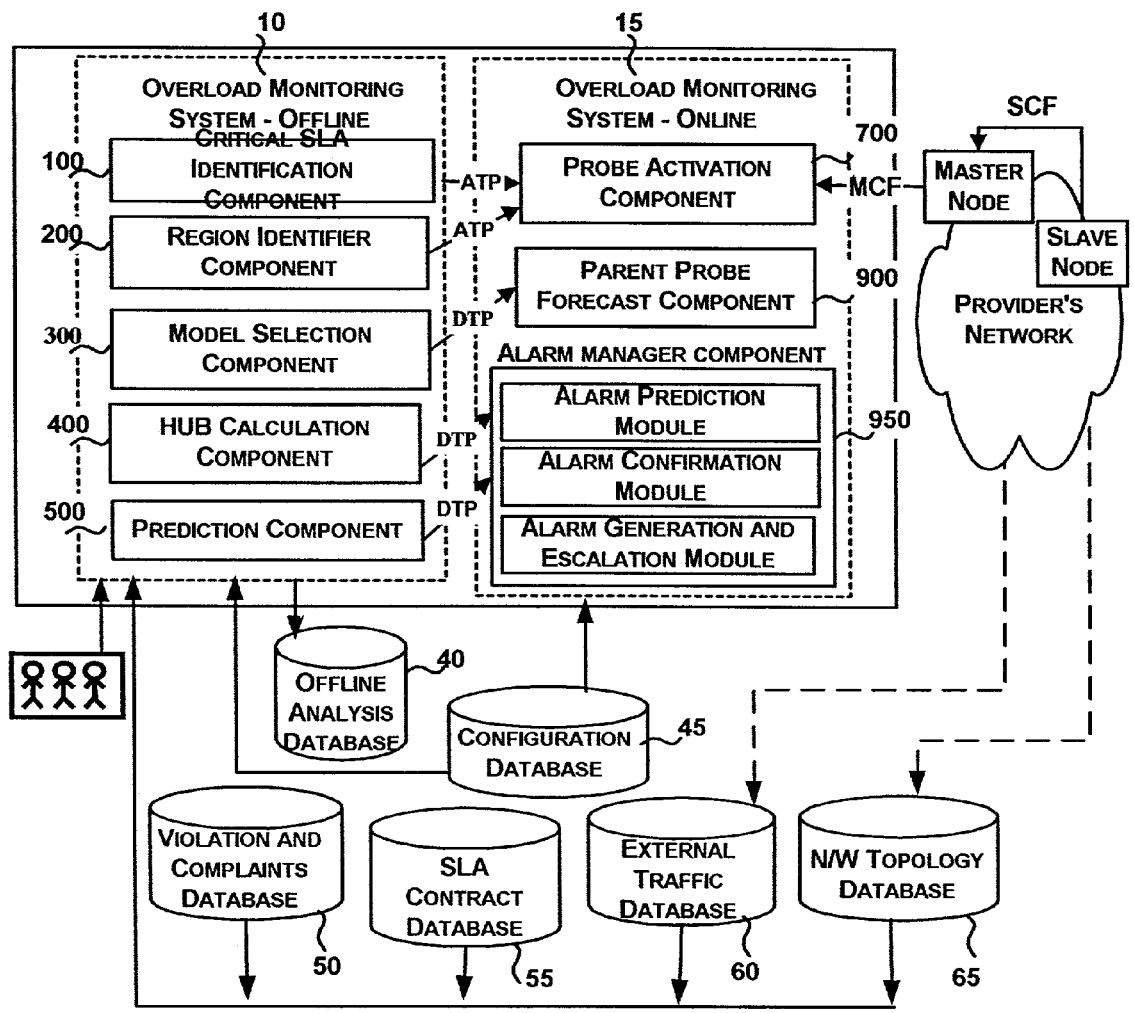
FIG.A: OVERLOAD MONITORING SYSTEM - OFFLINE & ONLINE

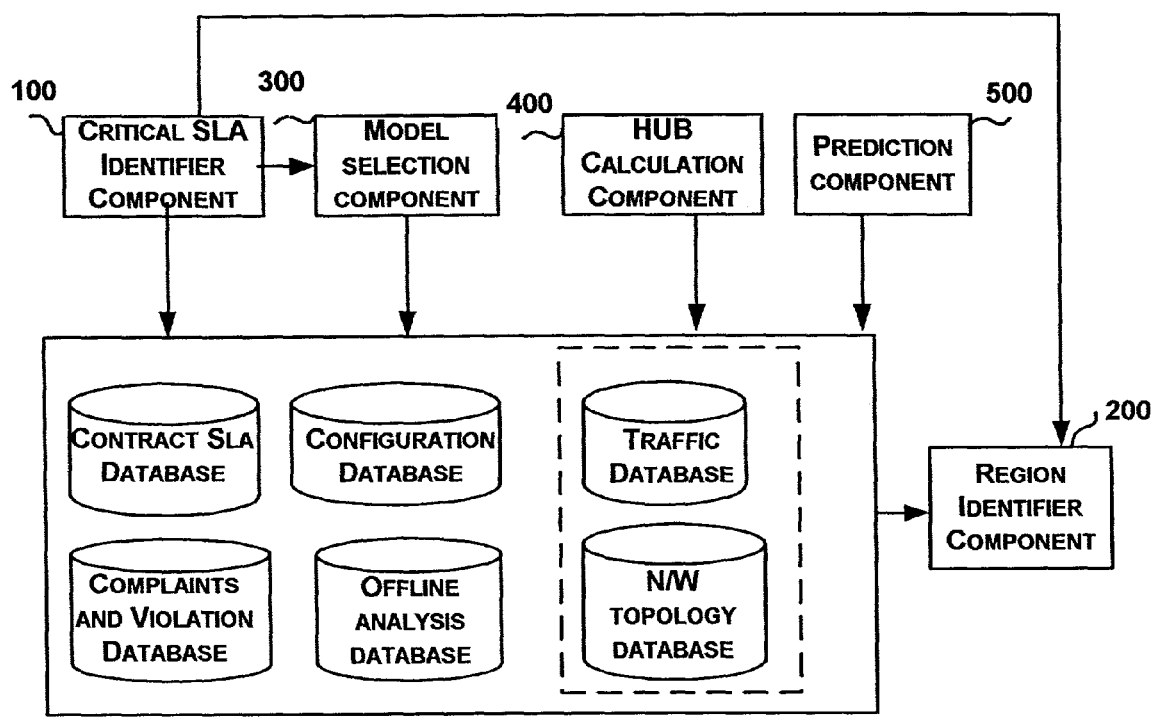
FIG.B: OVERLOAD MONITORING SYSTEM - OFFLINE FUNCTIONALITY

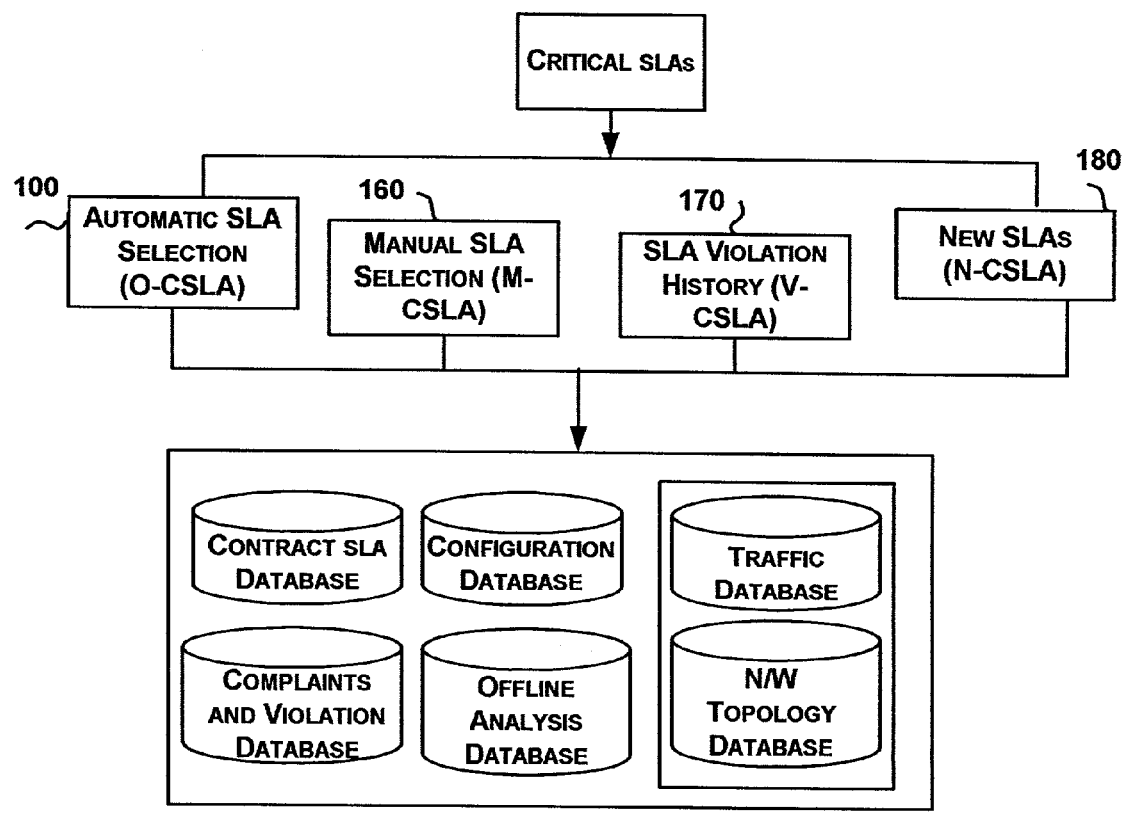

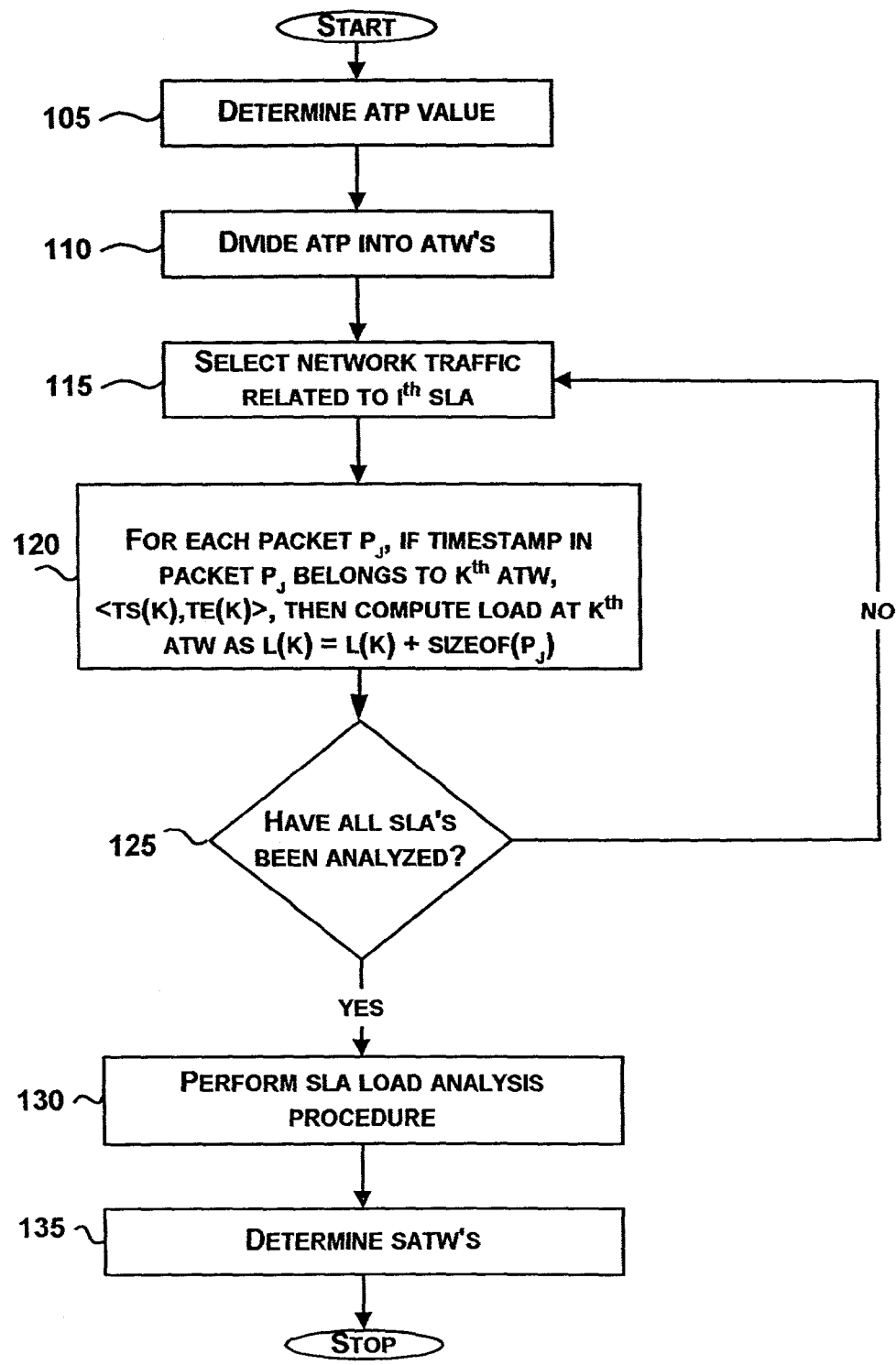

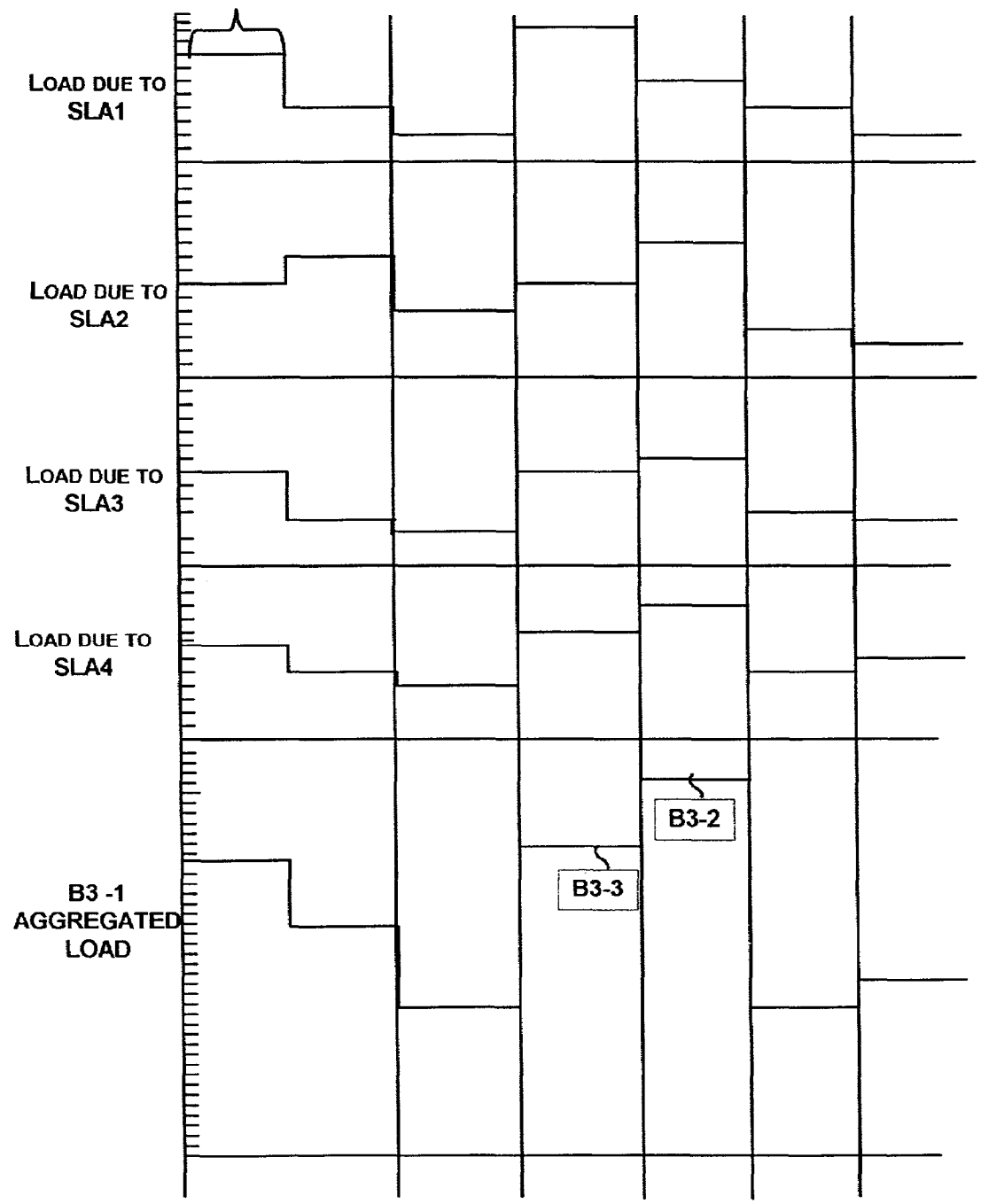

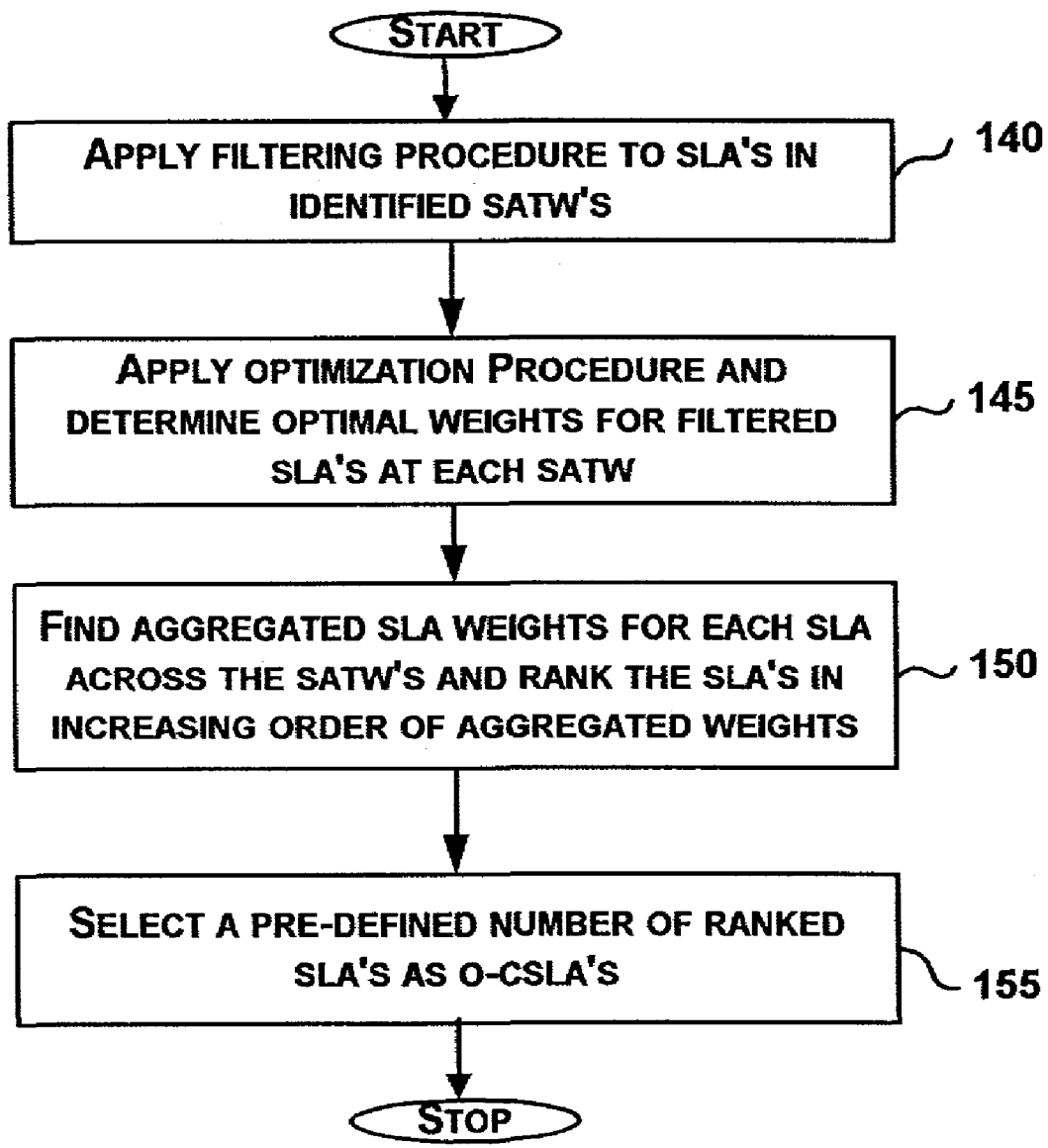
FIG.B4: IDENTIFICATION OF O-CSLAs

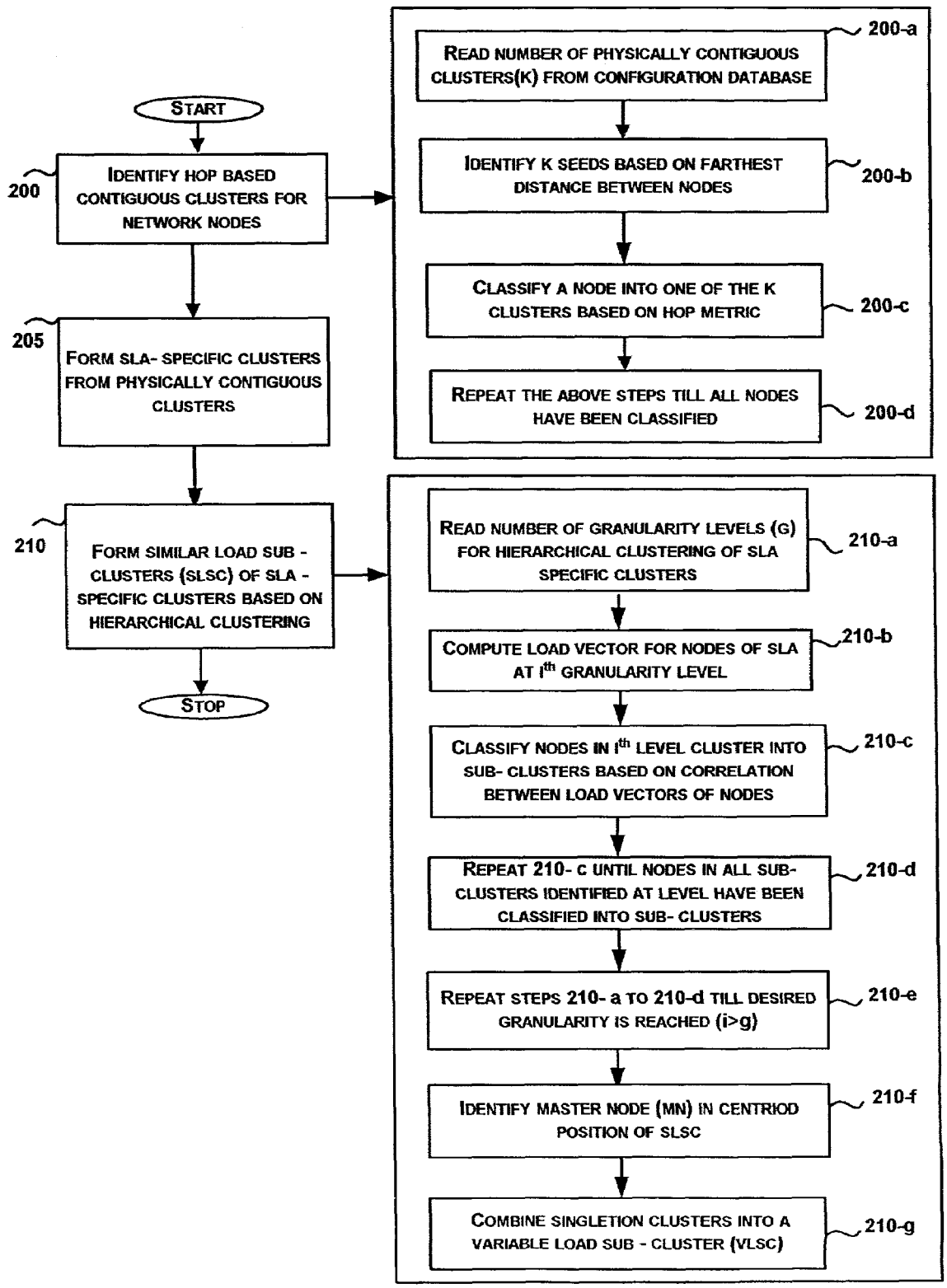

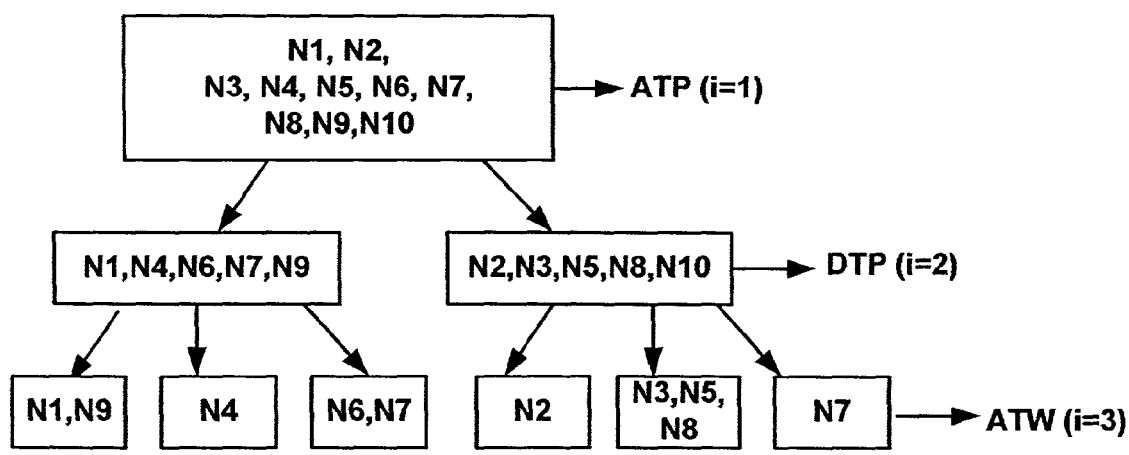
Fig.B6: Hierarchical Clustering Procedure

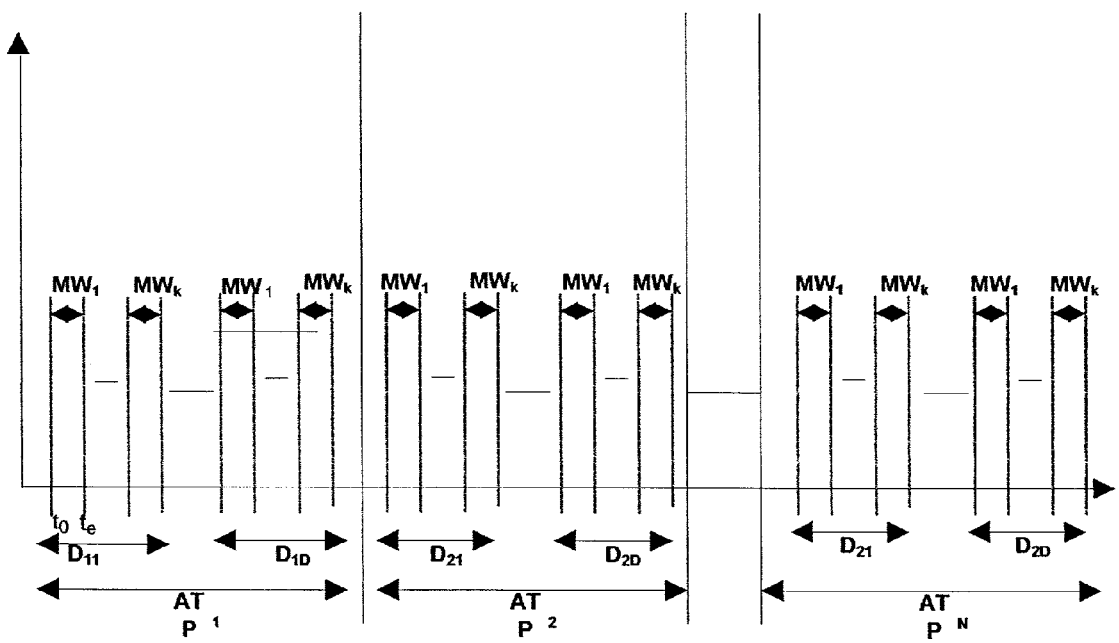
FIG.B7: LOAD DUE TO SLA
ATP$_I$ — SEQUENCE OF ANALYSIS TIME PERIODS
D$_{IJ}$ — J$^{th}$ SUB-INTERVAL IN THE I$^{th}$ SUCCESSIVE ANALYSIS TIME PERIOD.
MW$_K$ — MODEL WINDOW WITHIN A D$_{IJ}$

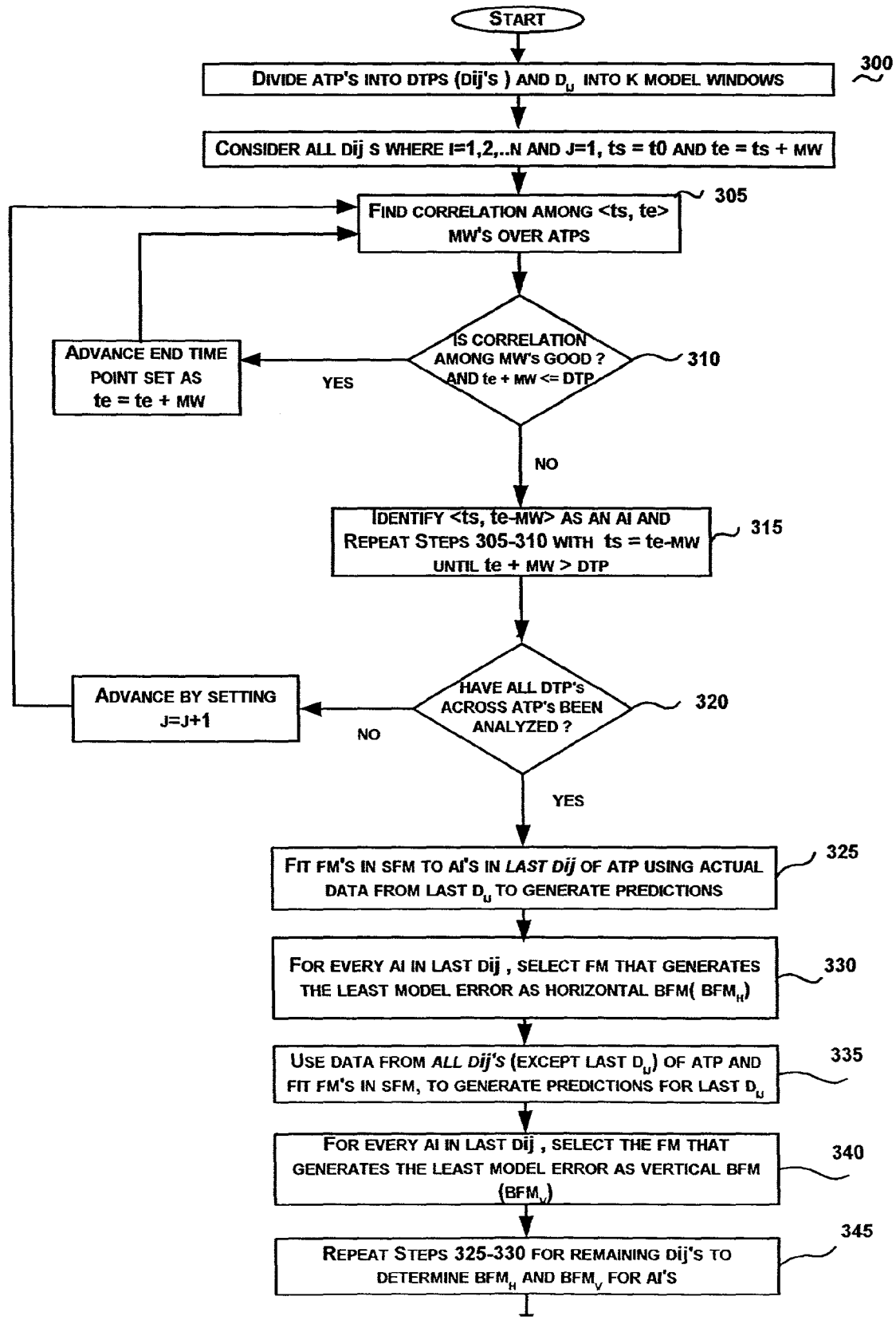
FIG.B8: MODEL SELECTION COMPONENT - VERTICAL AND HORIZONTAL

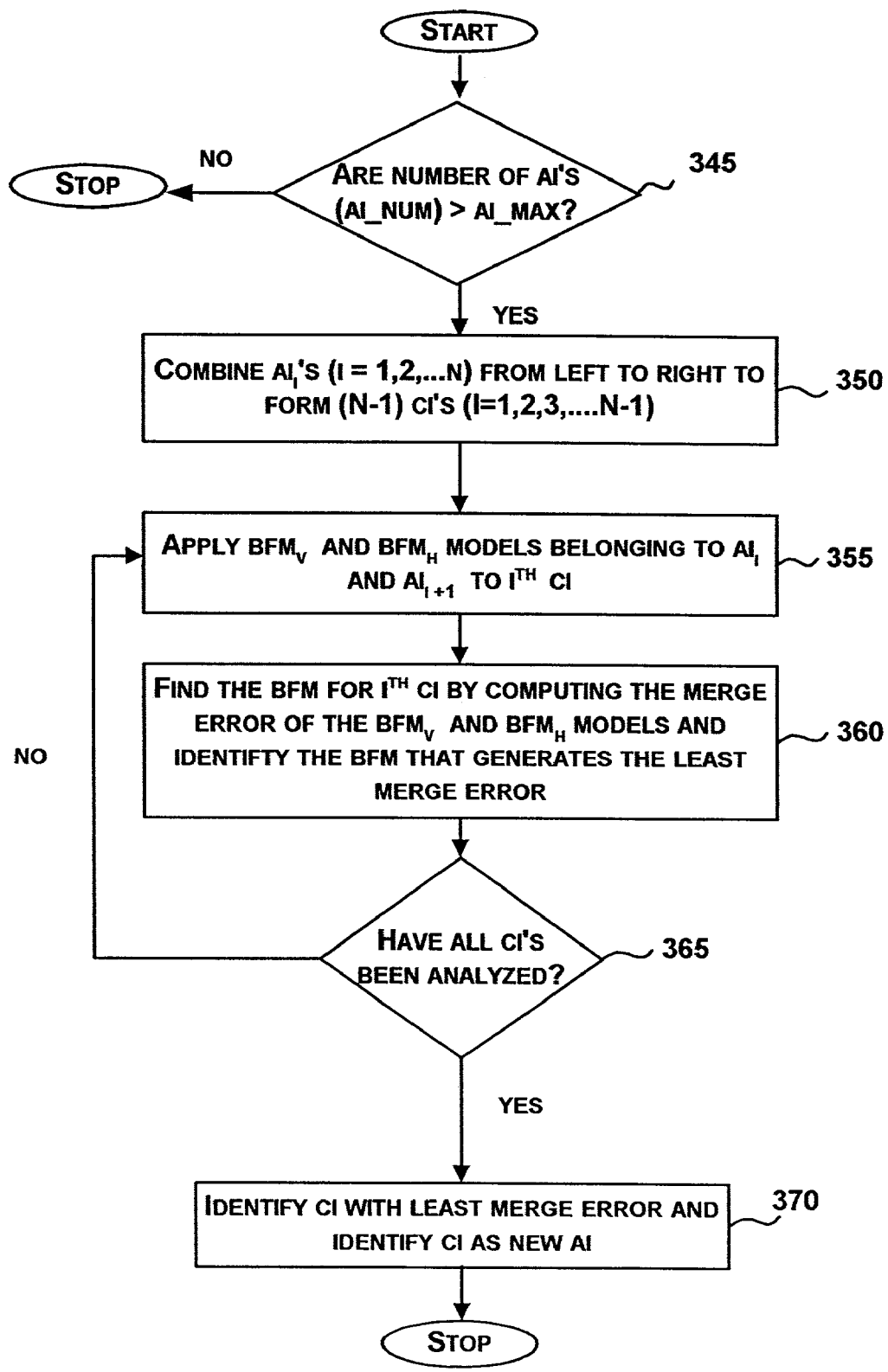
FIG.B9: MERGING ALGORITHM

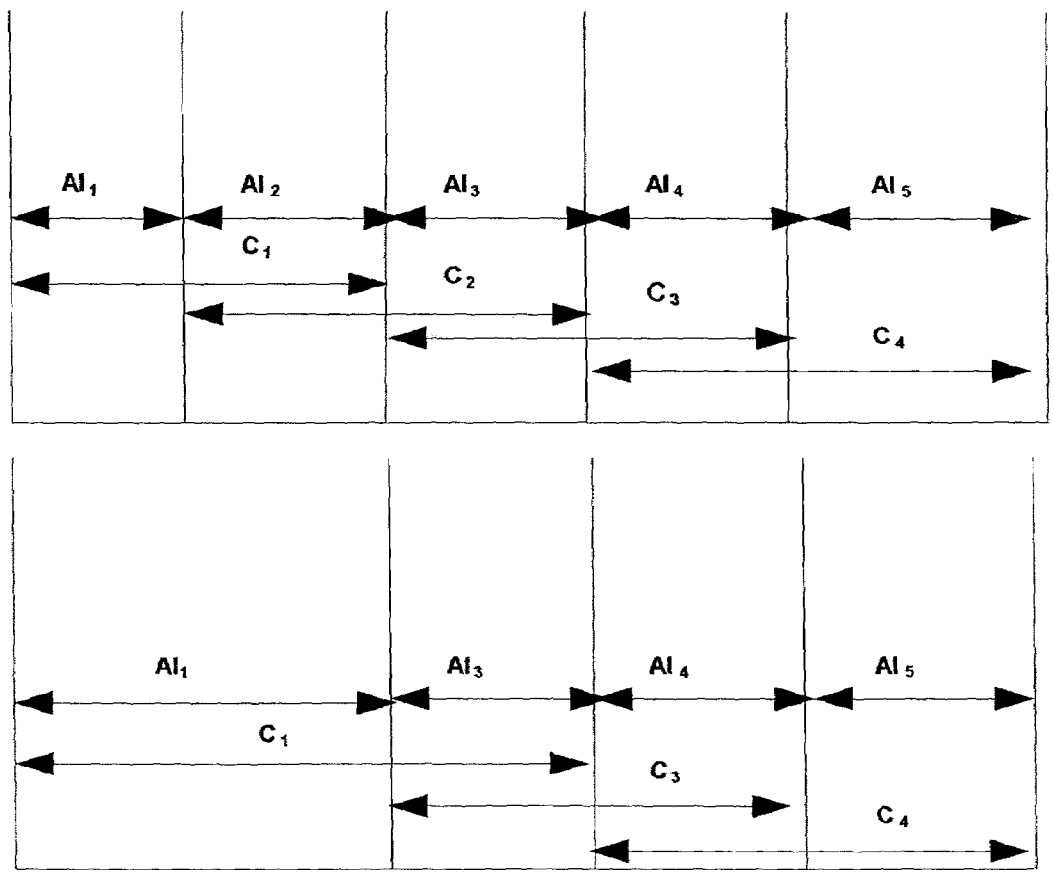
FIG.B10: MERGING OF AI's

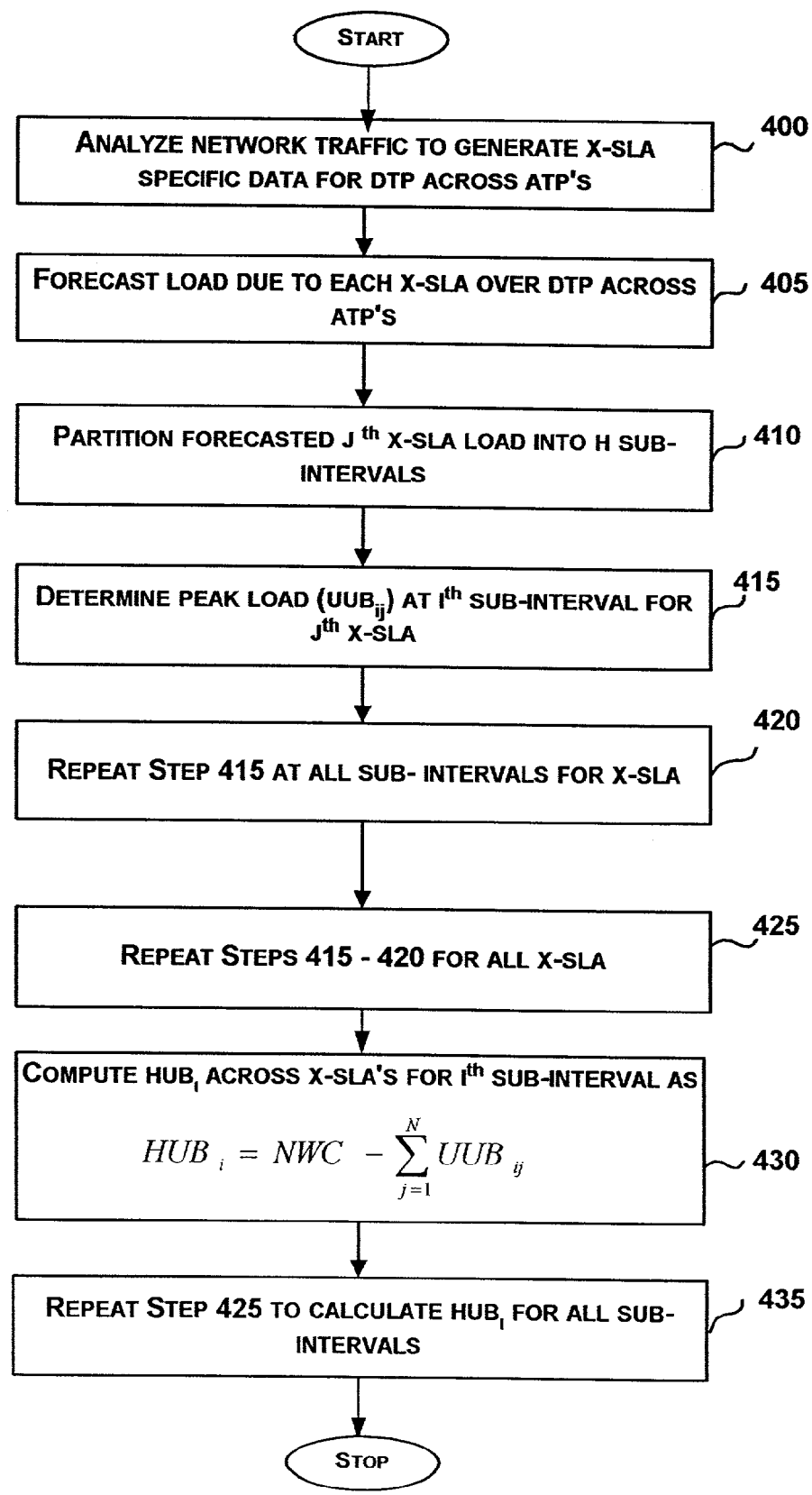
FIG.B11: DTP-WISE HUB COMPUTATION

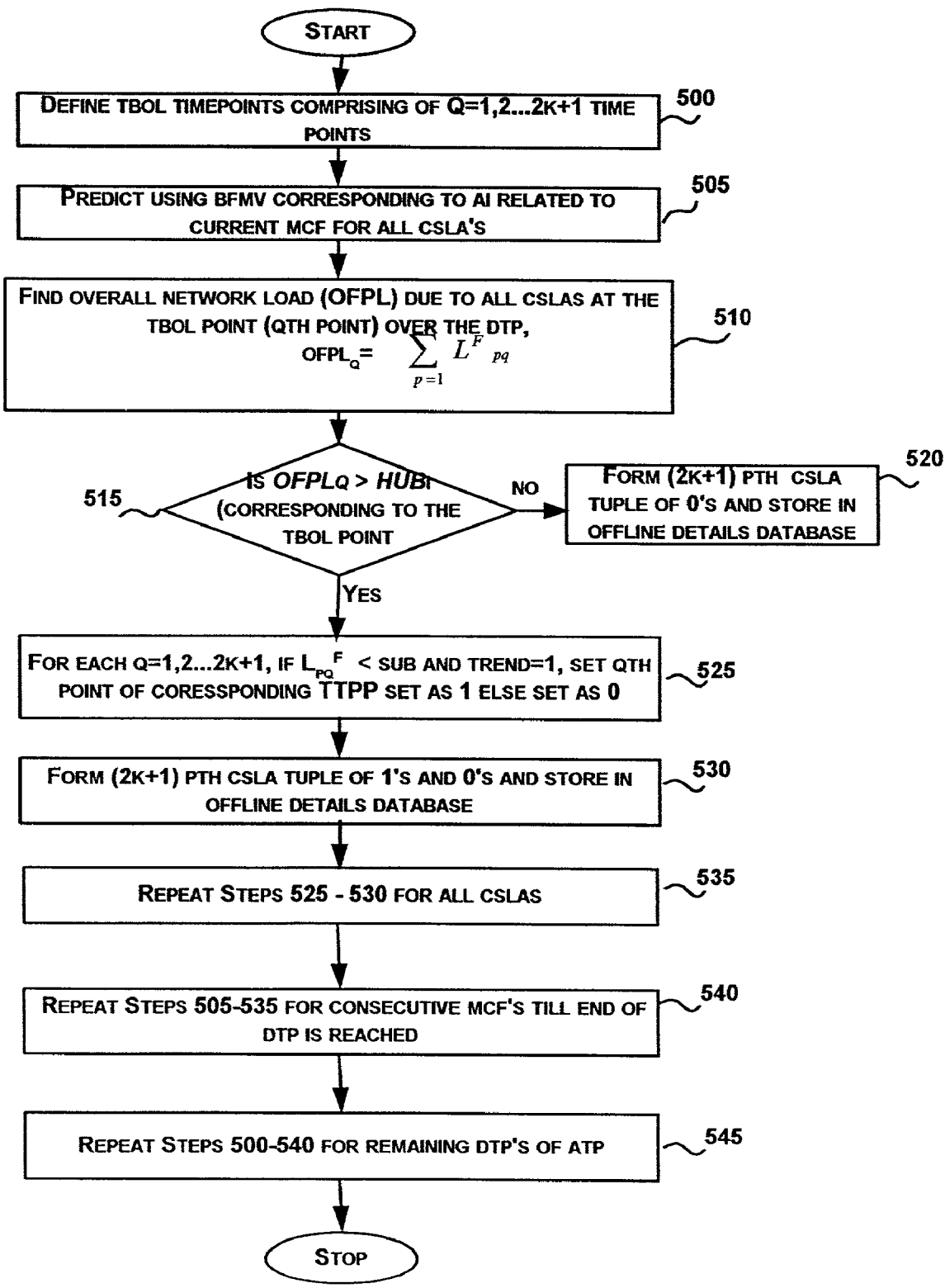
Fig.B12: Prediction Component

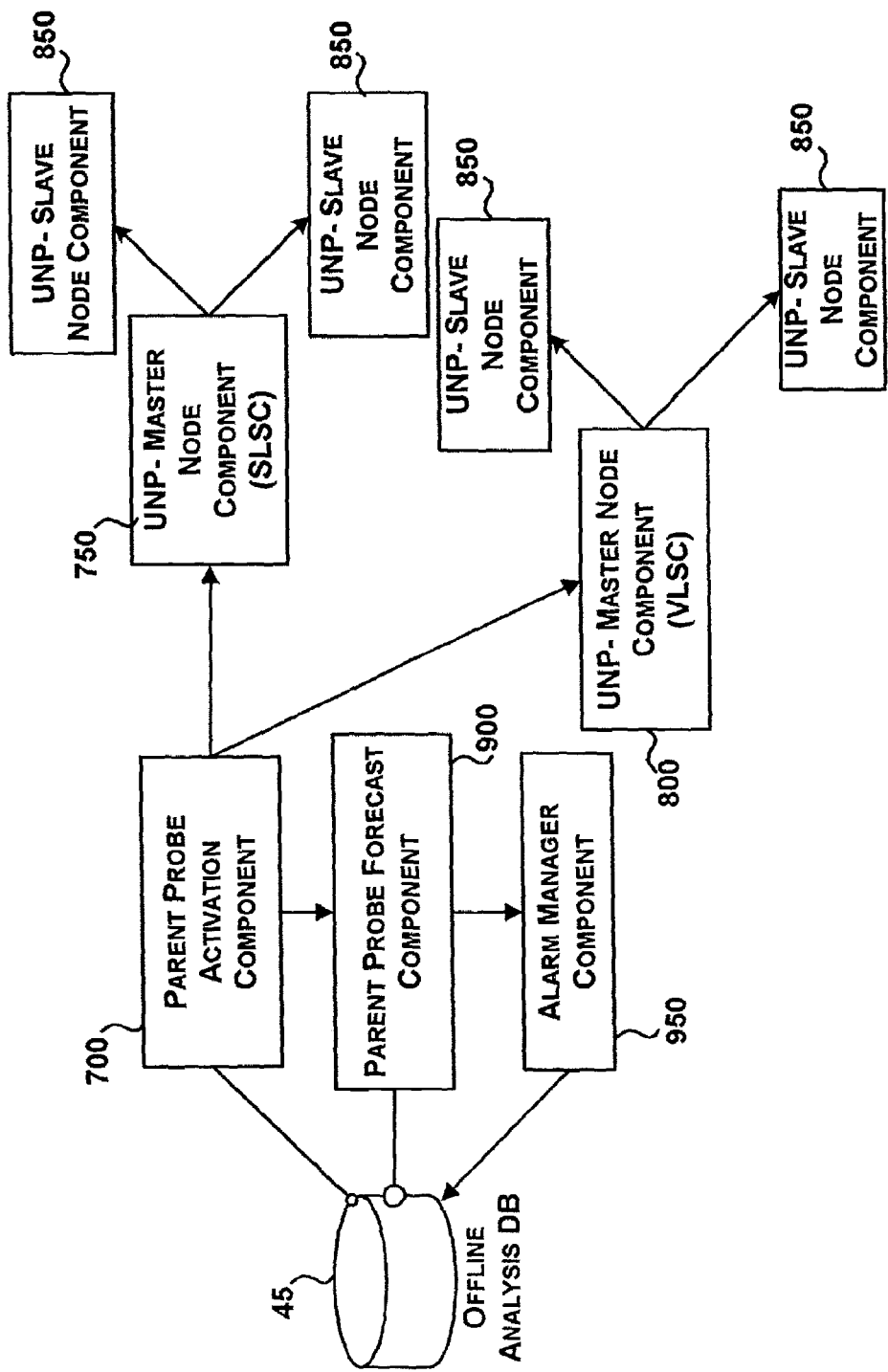

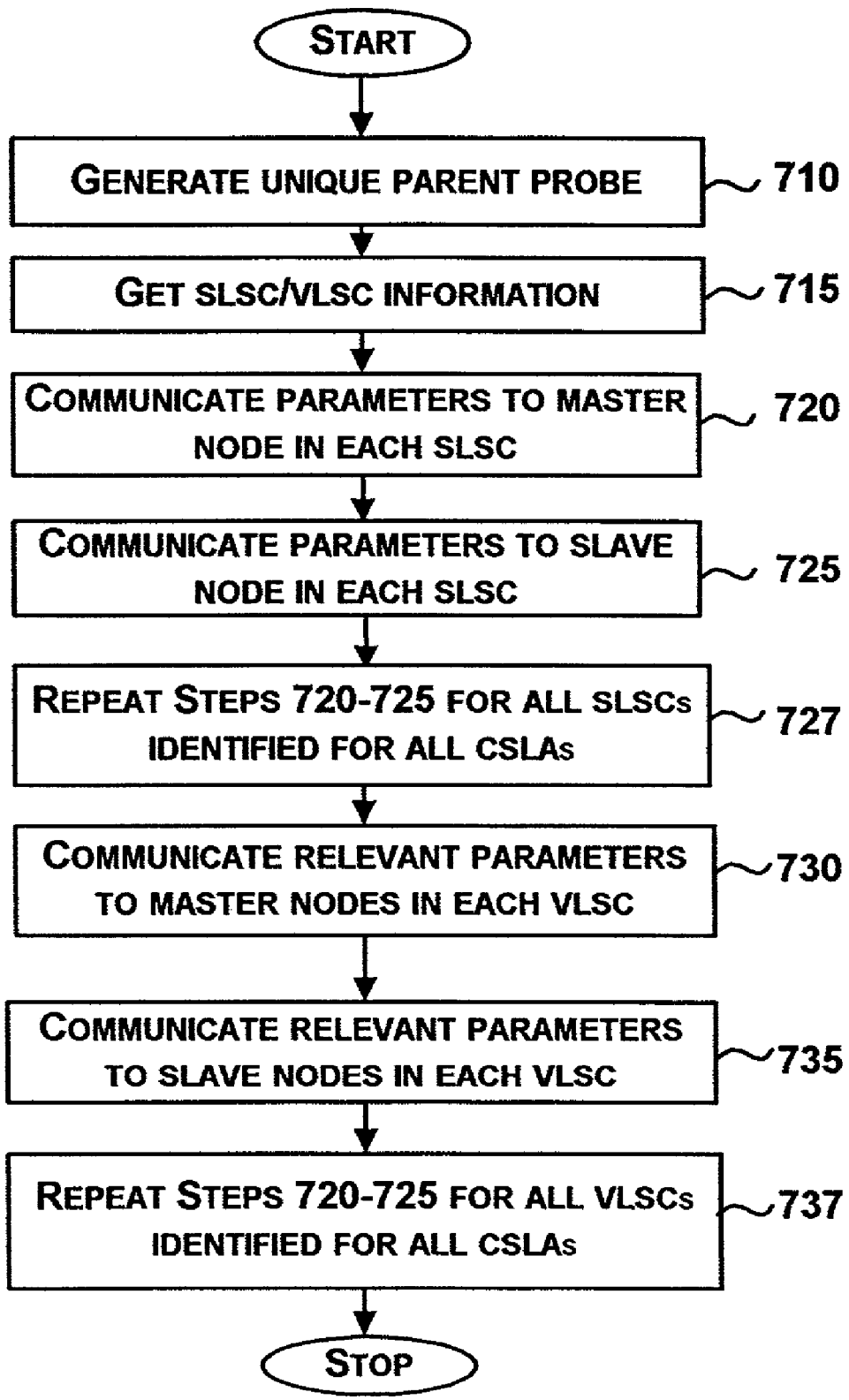

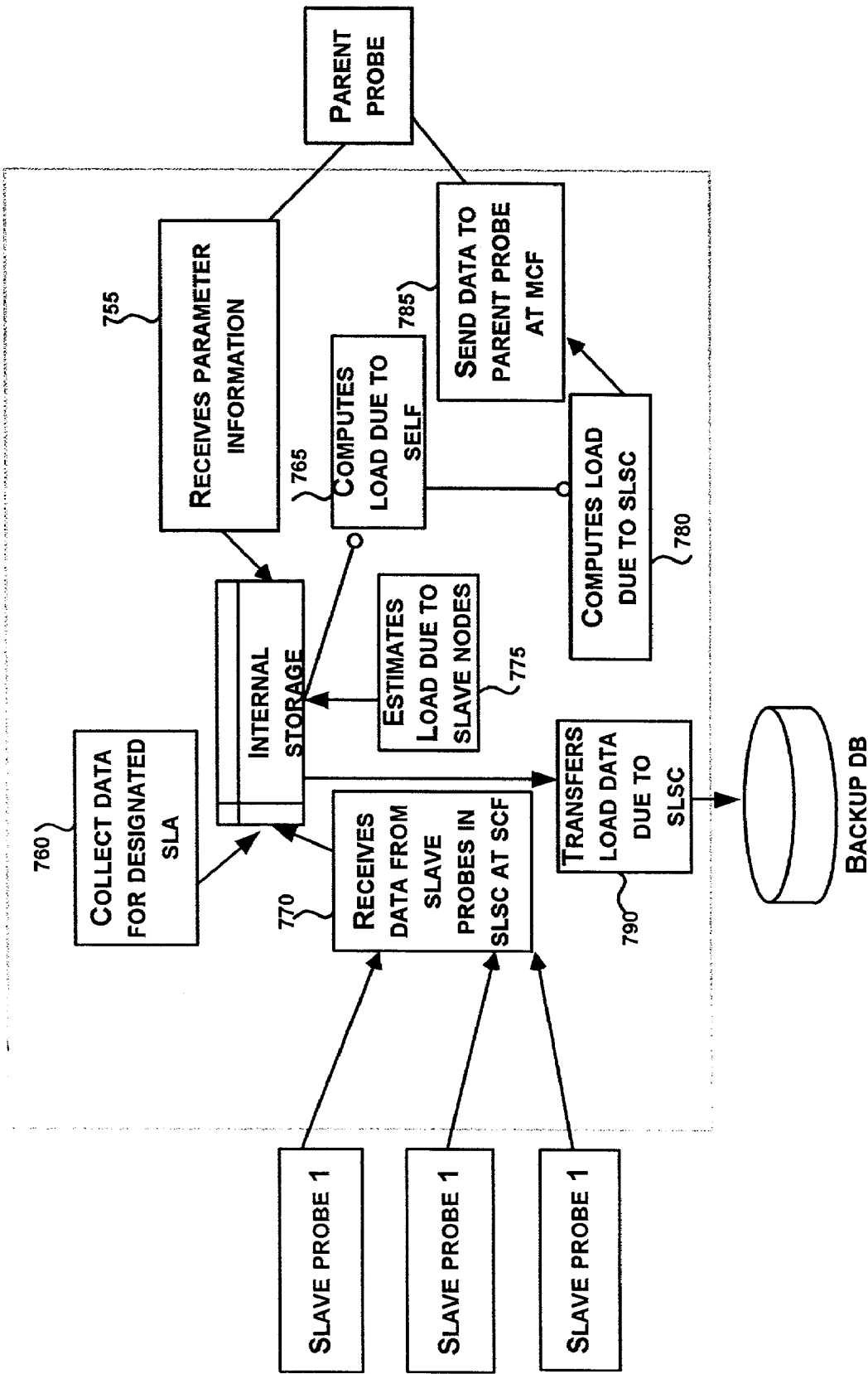

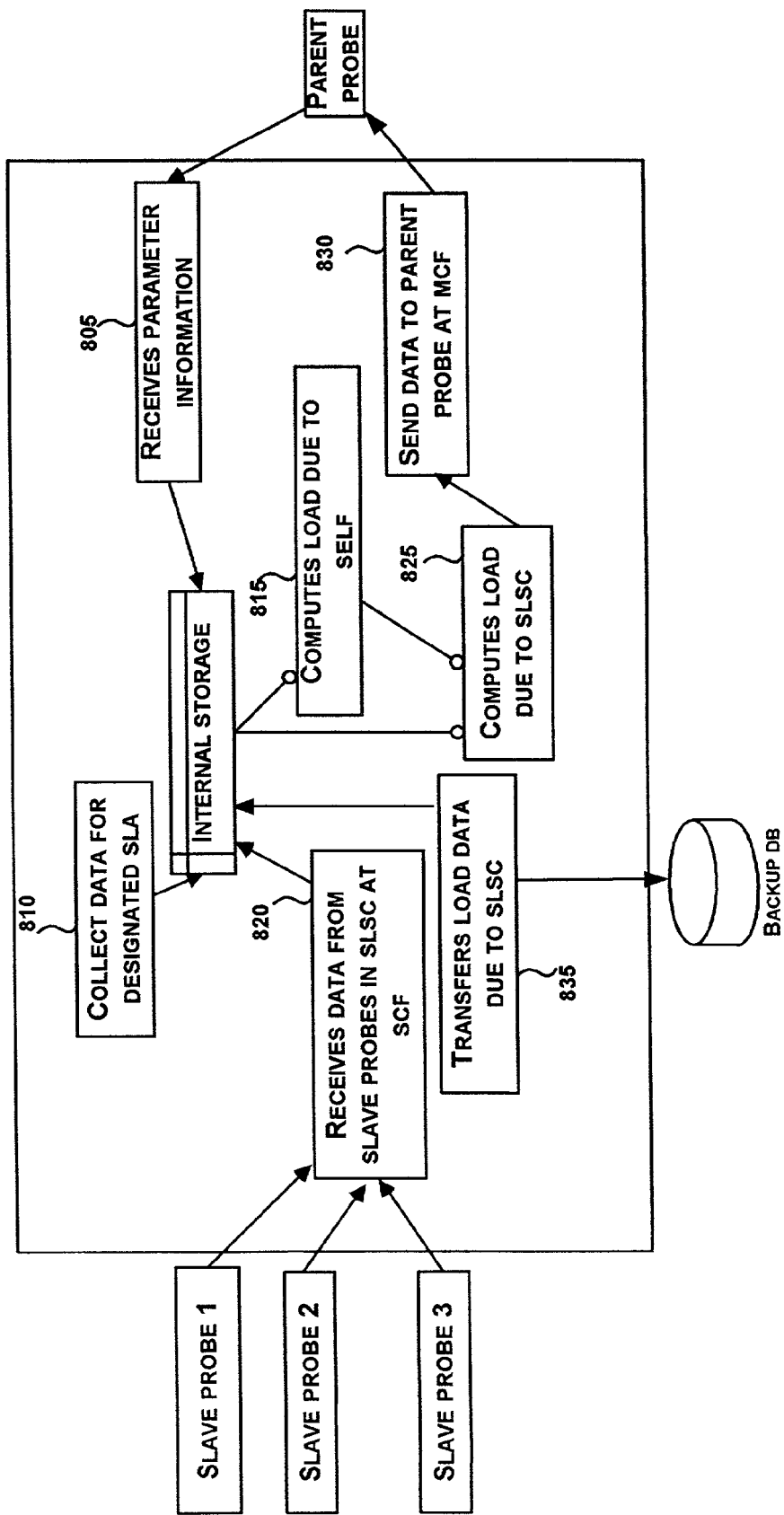
FIG.C3: MASTER PROBE COMPONENT FOR VLSC

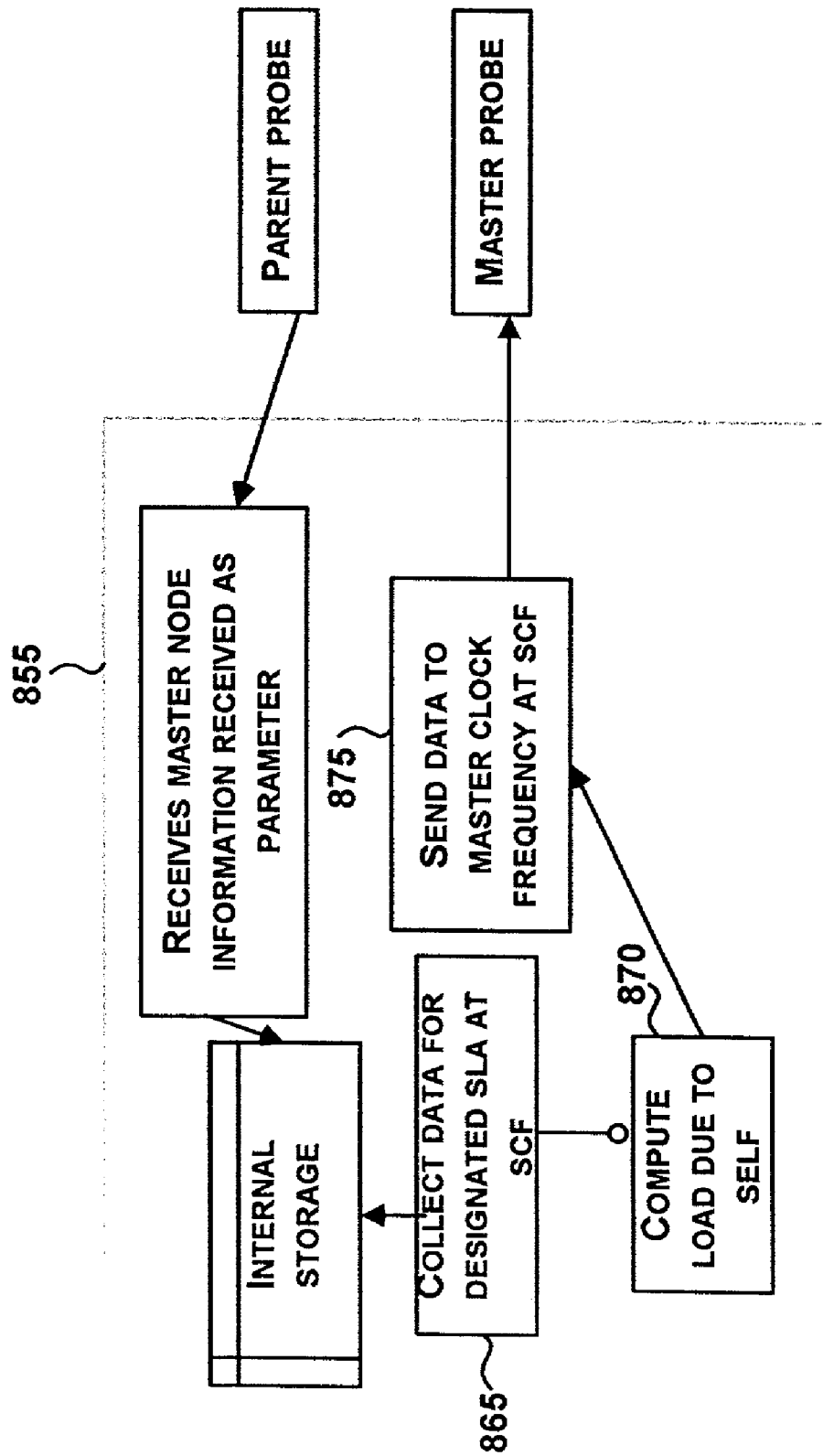

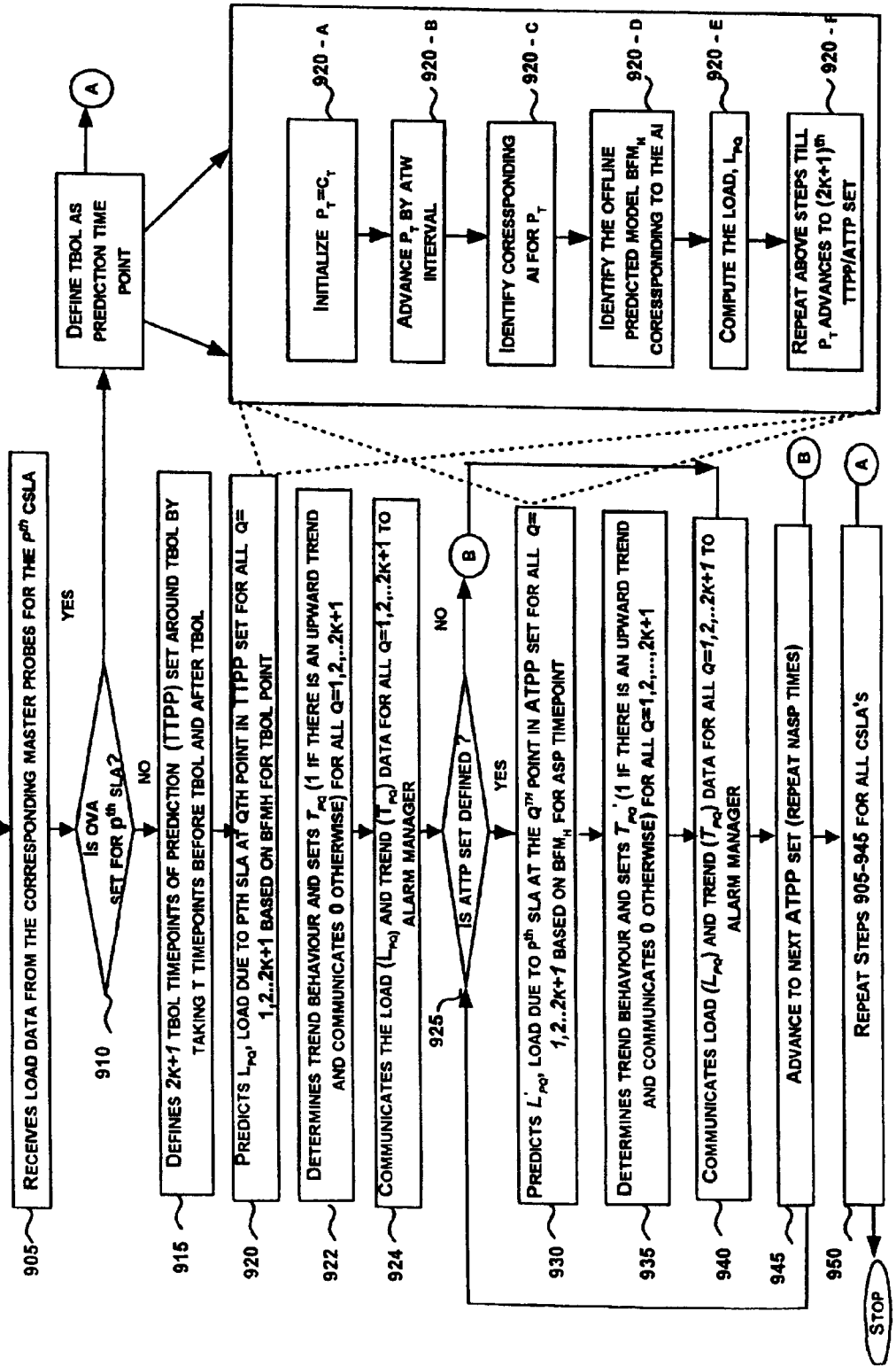
FIG.C5: Parent Probe Forecast Component for $p^{th}$ SLA

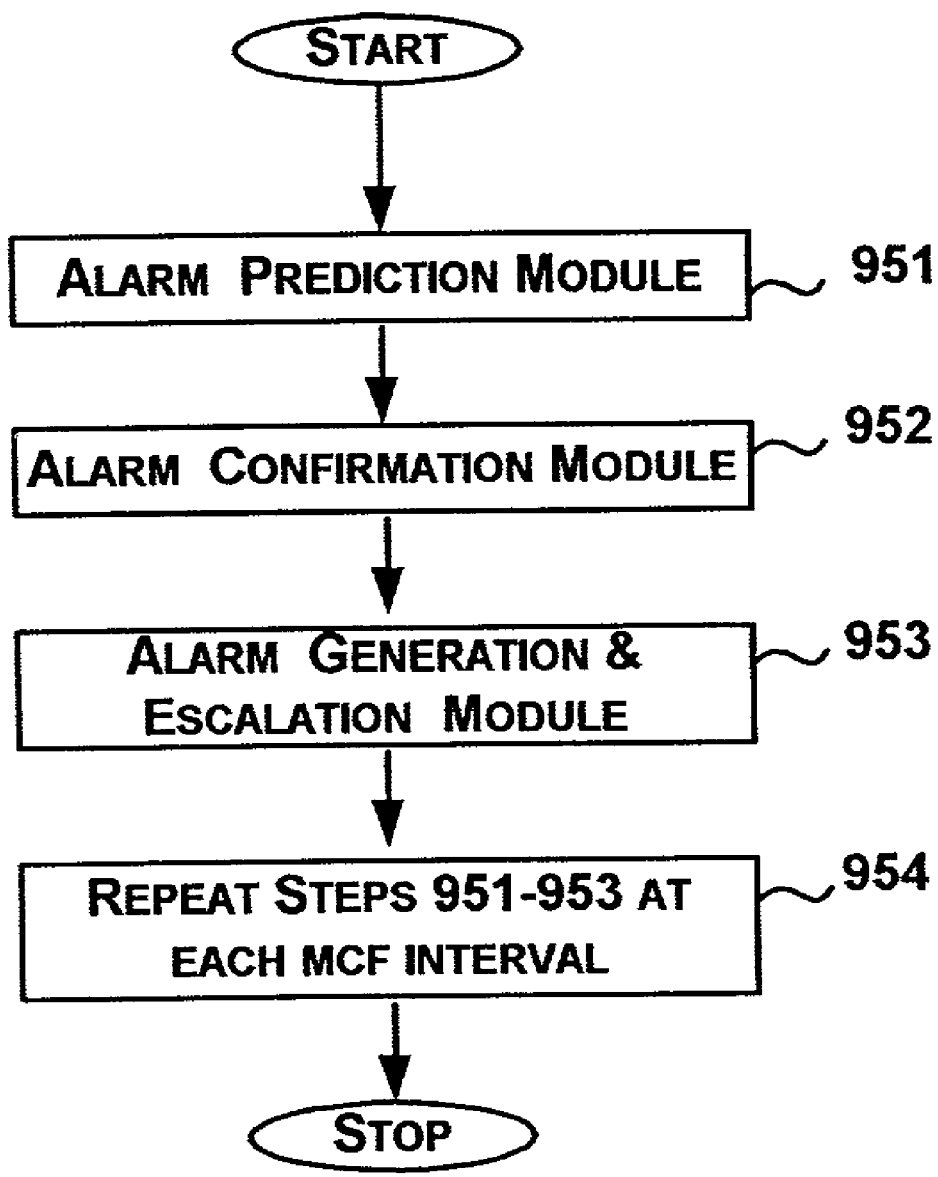

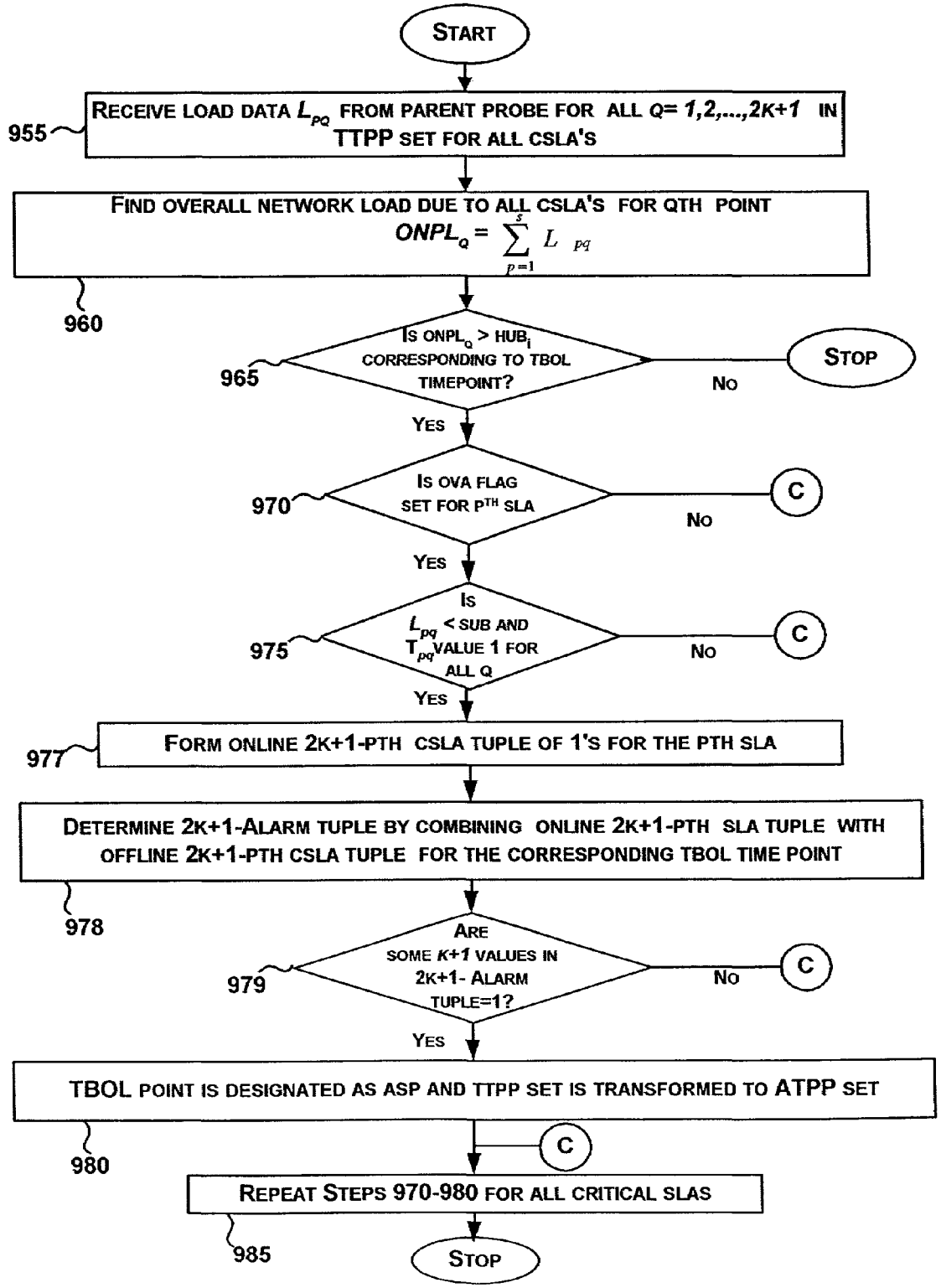

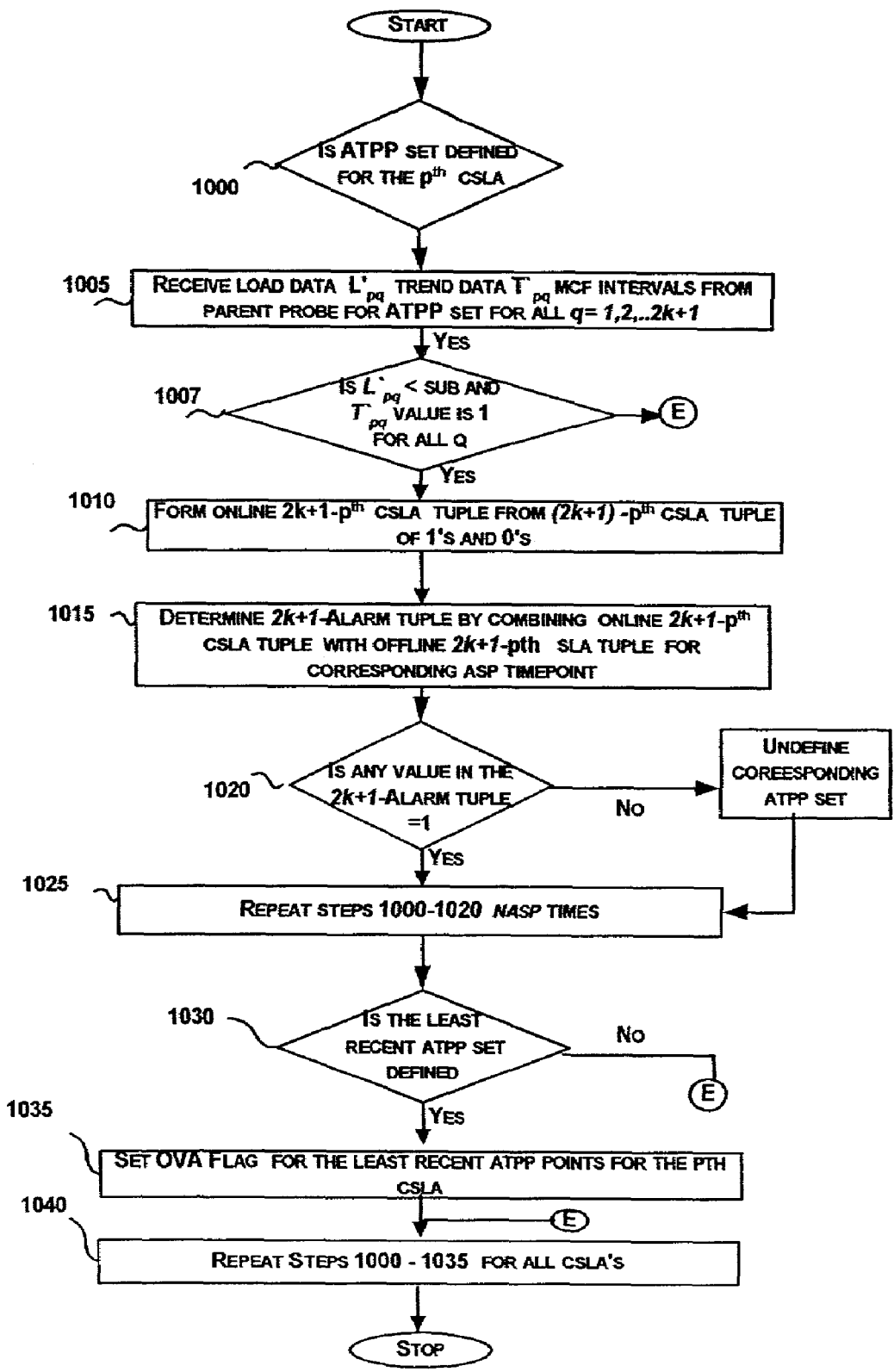

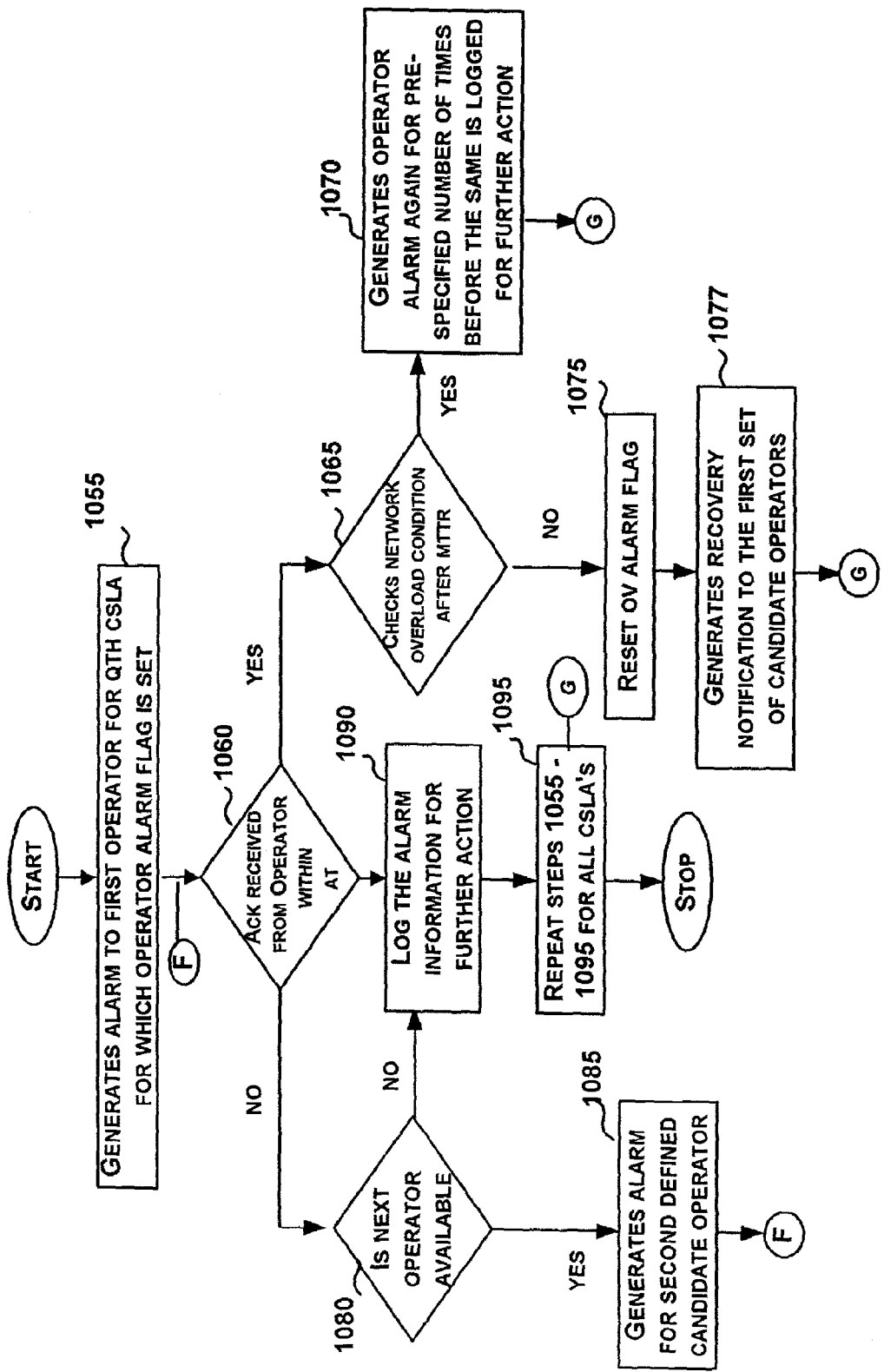
Fig.C8: Alarm Manager - Alarm Escalation

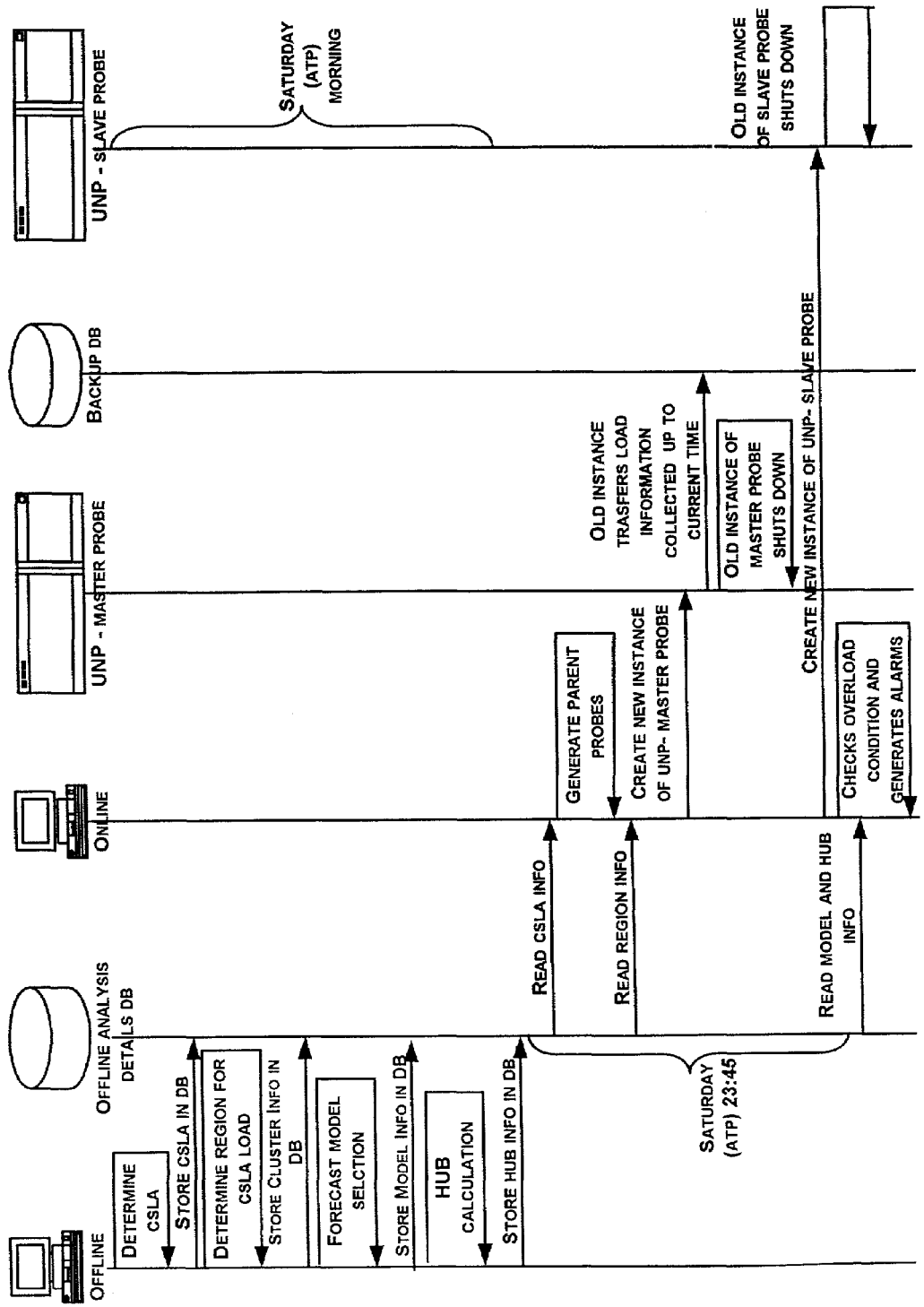

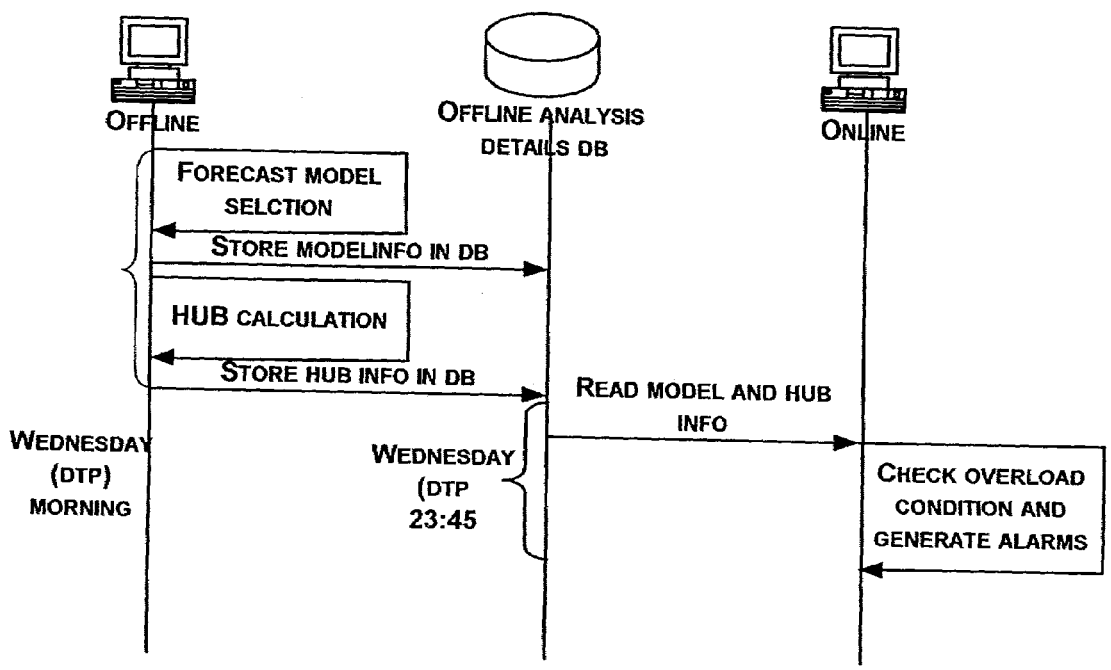
FIG.E: SAMPLE SCENARIO - 2

FIG.F1: CONFIGURATION DATABASE

| | |
|---|---|
| $CSLA_C$ | NO. OF CRITICAL SLA'S, TYPICAL VALUE = 35% OF SLA'S |
| $O\text{-}CSLA_C$ | NO. OF O-CSLAS, TYPICAL VALUE = 15% OF CSLA'S |
| $V\text{-}CSLA_C$ | NO. OF V-CSLAS, TYPICAL VALUE=10% OF CSLA'S |
| $M\text{-}CSLA_C$ | NO. OF M-CSLAS, TYPICAL VALUE=5% OF CSLA'S |
| $N\text{-}CSLA_C$ | NO. OF N-CSLAS, TYPICAL VALUE=5% OF CSLA'S |
| ATP | PERIODICITY DESCRIBED IN WEEKS, TYPICAL VALUE = 1 |
| DTP | PERIODICITY DESCRIBED IN DAYS, TYPICAL VALUE = 1 |
| ATW | WINDOW FOR TRAFFIC ANALYSIS IN MSEC, TYPICAL VALUE = 10 MS |
| SATW | NO. OF SENSITIVE ATW'S FOR SLA LOAD ANALYSIS, TYPICAL VALUE=35% |
| SCF | TYPICAL VALUE = 30 MINS |
| MCF | TYPICAL VALUE = 5 MINS |
| $AI_{LOWER}$ | MIN. NO. OF AI'S, TYPICAL VALUE=4 |
| $AI_{UPPER}$ | MAX. NO. OF AI'S, TYPICAL VALUE=8 |
| H | HOP FACTOR H, TYPICAL VALUE=1 |
| I | GRANULARITY LEVEL, TYPICAL VALUE=3 |
| TBOL TIME POINT | TYPICAL VALUE = 8HRS |
| AT | TYPICAL VALUE = 15 MINS |
| MTTR | TYPICAL VALUE=4HRS |
| EL | NO. OF ESCALATION LEVELS, TYPICAL VALUE = 3 |

FIG.F2: OFFLINE DETAILS DATABASE

| O-CSLA | SET OF IDENTIFIED O-CSLA'S FOR THE CURRENT ATP | | | |
|---|---|---|---|---|
| V-CSLA | SET OF IDENTIFIED V-CSLA'S FOR THE CURRENT ATP | | | |
| M-CSLA | SET OF IDENTIFIED M-CSLA'S FOR THE CURRENT ATP | | | |
| N-CSLA | SET OF IDENTIFIED N-CSLA'S FOR THE CURRENT ATP | | | |
| HUB | HUB FOR CRITICAL SLAS'S FOR CURRENT DTP | | | |
| AI | SLA ID | START-TIME | END-TIME | FM |
| | | | | |
| SLA-WISE ALARM DATA | SLA ID | ALARM GENERATION TIME | EXPECTED OVER LOAD TIME | OPERATOR ID | ESCALATION LEVEL |
| | | | | | |

FIG.F3: VIOLATION AND COMPLAINTS DATABASE

| SLA ID | TIME OF VIOLATION | EXCESS UTILIZATION (+VE SUBSCRIBER VIOLATION, -VE OPERATOR VIOLATION |
|---|---|---|
| | | |

| SLA ID | TIME OF COMPLAINT | TYPE OF COMPLAINT |
|---|---|---|

FIG.F4: SLA Contract Database

| SLA ID | CONTRACTUAL ITEM (BANDWIDTH) | CONTRACTUAL VALUE |
|---|---|---|
| | | |

Fig F5: NW Traffic Database

| SLA ID | TIME-STAMP | START IP | NEXT HOP IP | PACKET SIZE (IN BYTES) |
|---|---|---|---|---|
| | | | | |

Fig F6: NW Topology Database

| START IP | NO. OF HOPS | LIST OF DESTINATION IP's |
|---|---|---|
| | | |

SYSTEM AND METHOD FOR STATIC AND DYNAMIC LOAD ANALYSES OF COMMUNICATION NETWORK

FIELD OF INVENTION

This present invention relates to real-time monitoring of SLAs in general and more particularly monitoring a subset of SLAs. Still more particularly, the present invention relates to a system and method for prediction of operator SLA violation based on monitor-data.

BACKGROUND OF INVENTION

A Service Level Agreement (SLA) is a contract between two parties, the service provider and a subscriber, or between two service providers, that specifies, in terms of metrics, the type and level of service that can be obtained from the service provider. The metrics are measurable QoS parameters with agreed upon threshold values. Failure to meet these thresholds result in penalties, which are degrees of compensations mutually, agreed upon by the service provider and customer. Network and service performance need to be monitored for their degradation in order to avoid SLA violations, which might cause the provider to pay penalties. Therefore, real-time traffic flows across network segments need to be closely monitored for performance degradations.

A real-time monitoring system generally monitors network traffic for violation of threshold values agreed upon in SLAs and appropriately sends alarms to the operator in the event of any violations. Threshold violations of agreed upon terms is determined by monitoring all the SLAs and the monitor-data for traffic analysis is generally collected from the network elements by launching agents in all the network elements. Reporting tools have been developed for offline analysis of historic traffic data to generate trend reports for future traffic behavior. Real-time monitoring of SLAs have an impact on the network traffic since network agents that are installed in the various network elements generate continuous monitor-data related to the SLAs to help determine SLA violations. Real-time monitoring of networks are generally performed using two types of methods, namely, passive methods (non-intrusive monitoring) and active methods (intrusive monitoring). Passive methods generally retrieve the information from the packets that are received by a network element by reading the packet-header information and hence non-intrusive characteristics are used by passive methods for monitoring the network. Active methods retrieve information related to performance parameters by injecting additional probe packets across the network and hence intrusive characteristics are used by active methods for monitoring the network. The additional probe packets are inserted in between normal data packets. Real-time monitoring of SLAs is also performed by implementing a policy-based network architecture, which comprises of translating the SLAs into policies. The policies are then specified and entered into to a Policy Server. These policies can either be dynamic or static. Dynamic policies specify how to react when a particular criterion is met. Static policies basically check for the validity of defined criteria. Policy servers read the defined policies from a repository, determine the targets, and forward the policy information to appropriate policy agents/clients that reside in the network element. Then, policy clients translate the policy information received from the policy server and convert it to element specific configurations. The policy clients continuously monitor for these dynamic and static policies and respond to the policy server or take some action based on defined criteria.

Regardless of the usefulness of network monitor-data to operators for the purposes of network management, monitoring will quickly be discontinued if the network overhead due to monitor-data increases to such a point that the flow of data through the network is adversely affected. The monitoring of data should be in such a way that the measurement tools can remain in operation at all times, especially during high workload and system stress situations.

The present invention reduces the monitor-data flow across the network by monitoring only a subset of the SLAs and by optimally distributing the "intelligent" network probes across the network. The subset of SLAs to be monitored is identified based on an optimal analysis of the network load and past violation patterns. The optimal distribution of network probes is based on the "load similarity" of the nodes of the network and due to this aspect of the network nodes, the probes in the select network nodes are capable of computing the network load due to the subset of SLAs by predicting the load at rest of the nodes based on the notion of similarity. This approach leads to the reduction in monitor-data flow across the network.

the nodes based on the notion of similarity. This approach leads to the reduction in monitor-data flow across the network.

Revenue enhancement is one of the key requirements of any network provider. The key factors for sustained revenue generation are management of network capacity, penalty reduction by providing service assurance as contractually agreed in an SLA, and retaining the subscribers by reducing churn rate.

The objective of the network capacity management is to be able to successfully load the network to its capacity. By reducing the monitor-data flow within a network, more network bandwidth is available for carrying payload and hence contributing to increased revenue to network provider. An additional way for the provider to enhance revenue is to allow for over-subscription. Under such conditions, there is a possibility of network overload leading to operator SLA violations. Hence, there is a need to establish a balance between penalty reduction and over-subscription. The present invention aims at generating operator violation alarm at a future time point based on cross-correlation of past and present usage pattern data. More accurate the operator violation predictions, higher are the chances for the operator to increase the revenue based on over-subscription.

U.S. Pat. No. 6,147,975 to Bowman-Amuah for "System, method and article of manufacture of a proactive threshold manager in a hybrid communication system architecture" (issued Nov. 14, 2000 and assigned to AC Properties B.V. (NL)) describes a proactive threshold manager that forewarns service providers of an impending breach of contract. The threshold manager sends an alarm to the service provider when the current level of service misses a service level agreement to maintain a certain level of service.

The above said invention makes use of real-time monitor-data related to all service level agreements to check the current level of service. This adds to the network congestion during the times of network overload. As compared to the above-mentioned patent, the present invention aims at reducing the monitor-data flow by monitoring a select set of SLAs and by a regionalization procedure to cluster the network nodes based on similar load behavior. In addition, the present invention generates alarms by combining the prediction of the current usage pattern based on a best possible, from a suite of forecasting models, model with the prediction of the usage pattern in the past based on a best possible, from a suite of forecasting models, model. Furthermore, the present invention makes the operator SLA violation prediction more realistic, and hence reduces the generation of false alarms, by analyzing the forecasted usage pattern trend and focusing on only those CSLAs where the load due to each such CSLA being below the contractually agreed upon bandwidth for that CSLA.

U.S. Pat. No. 6,272,110 to Tunnicliffe, et al. for "Method and apparatus for managing at least part of a communications network" (issued Aug. 7, 2001 and assigned to Nortel Networks Limited (Montreal, Calif.)) comprises of managing a communications (customer's) network by predicting sequential future values of a time-series of data (representative of traffic levels in the network) to determine whether they exceed bandwidth levels as defined in the SLA. In contrast to the above-mentioned patent, the present invention analyzes the traffic data at network-level as opposed to at customer-specific sub-network-level. Further, the present invention analyzes the load on the network from the network provider's perspective to reduce penalty situations.

Forecasting Techniques based on Time Series models have been applied to network resources in order to predict network traffic for the purposes of network management. "The Network Weather Service: A Distributed Resource Performance Forecasting Service for Metacomputing," by Rich Wolski, Neil Spring, and Jim Hayes, describes the Network Weather Service, which is a distributed, generalized system for producing short-term performance forecasts based on historical performance measurement. A suite of forecasting models is applied over the entire time-series and the forecasting technique that has been most accurate over the recent set of measurements is dynamically chosen as the representative model.

"Design-Assisted, Real-time, Measurement-Based Network Controls for Management of Service Level Agreements," by E. Bouillet, D. Mitra and K. G. Ramakrishnan, describes an SLA monitoring scheme that optimizes net revenue based on the flows related to a set of SLAs. This approach proposes two distinct phases: Offline phase that includes SLA crafting and online phase that includes real-time SLA management. Revenue gets generated by the admission of flows into the network and penalty is incurred when the service provider is not SLA compliant.

To summarize, the objectives of the present invention are the following:

An integrated Overload Monitoring System (OMS), for offline Critical Service Level Agreement (CSLA) Identification based on bandwidth (BW) and Near-Optimal Traffic Analysis for Forecasting BW-related CSLA Operator Violations at a future time point, comprising of:

a) offline procedures for critical SLA identification, regionalization of network nodes, historical data based forecast model selection, overall load due to critical SLAs and offline operator SLA violation prediction at a future time point;

b) universal network probes that perform a near-optimal analysis of the network traffic for critical SLAs; and c) online procedures for network traffic analysis by the network probes based on two distinct configurable clocks, online operator SLA violation prediction at a future time point and consistency based alarm generation.

SUMMARY OF INVENTION

The primary objective of the invention is the creation of a subsystem for the offline identification and real-time monitoring of a select set of SLAs termed as critical SLAs. Critical SLAs are a subset of SLAs wherein a slight variation in the usage pattern by the network users bound by these SLAs would cause a network overload. The pre-installed network probes perform a near-optimal analysis of the network traffic for only the critical SLAs, thereby minimizing the monitor-data flow across the network. In addition, the probes perform forecasting of the network traffic due to the critical SLAs to predict Operator SLA violations.

The objective of the present invention is achieved by the interaction between the offline and online components of the Overload Monitoring System (OMS). The OMS-Offline comprises of a Critical SLA Identification Procedure that relates to the analysis of network traffic in terms of the network load (bandwidth) due to the critical SLAs.

When there is insufficient network data available from the external databases, a passive agent is installed in network elements of the network to collect the necessary traffic data and the OMS Offline Component pulls this data from the network elements during times of low network usage thereby reducing the data flow in the network.

The Critical SLA Identification Procedure of the OMS-Offline comprises of a procedure to identify four types of critical SLAs, namely, O-CSLAs, using an automatic SLA selection technique based on an optimization procedure, V-CSLAs, based on past violation history of the SLAs, M-CSLAs, based on a manual selection of SLAs by operators, and N-CSLAs, based on an agreed upon bandwidth, as per the SLA of new subscribers.

The OMS-Offline further comprises of a Hard Upper Bound (HUB) Procedure to compute the overall network load due to the identified critical SLAs at periodic time intervals. The load due to CSLAs is marginalized from the overall network load, by taking into account the UUBs of X-SLAs.

According to a preferred development of the invention, the OMS-Offline comprises of a Forecast Procedure to predict the load due to the critical SLAs using horizontal and vertical model selection techniques on the historical data. The Forecast Procedure further comprises of an Analysis Interval (AI) Identification Procedure that identifies appropriate forecast models (FM) for each of the AIs.

The OMS-Offline further comprises of a Node Regionalization Procedure, based on a hierarchical clustering procedure. This procedure clusters nodes related to each of CSLAs having similar average (mean) load characteristics. Clusters are formed for the nodes in the service providers network based on the physical contiguity of the network elements and are further grouped into Similar Load Sub-Clusters (SLSCs) based on similar mean characteristics.

The OMS-Online of the present invention involves the creation of a unique parent probe for every critical SLA. The pre-installed network probes are referred to as Universal Network Probes (UNPs) since they behave as either master or Slave network probes depending on the parameter that is communicated to them. A master network probe is identified, for each SLSC, based on the centroid of the SLSC and the rest of the nodes in the SLSC are identified as locations for Slave network probes.

According to an advantageous preferred development of the invention, two distinct configurable clocks, namely, the master clock and the Slave clock, are used in the analysis of the network traffic. The master clock frequency is much higher than the Slave clock frequency to facilitate reduced monitor-data flow across the network. The Slave probe filters and aggregates the load at the Slave clock rate and communicates the Slave node load to the master probe. The master probe in turn filters and aggregates the traffic data at the master clock rate and computes the SLSC load based on the load obtained from the master node and the Slave nodes.

The OMS-Online of the present invention further consists of a procedure wherein the parent probe forecasts the load due to the corresponding SLA at the master clock frequency, wherein, the forecast is for a set of future time points that are Time Before OverLoad (TBOL) units away from the time of forecast. The parent probe further communicates the forecasted load to the Alarm Monitoring Component (AMC).

According to an advantageous further development of the invention, the parent probe forecasts the traffic data initially using the forecasting model identified during the offline procedure and receives the updated forecast models at pre-defined regular intervals. The parent probes of the above invention are also capable of identifying the underlying trend around TBOL of the forecasted load pattern and communicate the trend behavior to the AMC.

The OMS-Online of the present invention further comprises of a procedure wherein the AMC, based on the forecasted load and trend information received from the parent probes, computes the overall network load due to the critical SLAs. The AMC further determines the overload condition, to check whether the forecasted load is an indication of the load exceeding network capacity, by comparing the overall network load due to the critical SLAs with the HUB determined during offline analysis.

According to an advantageous further development, the AMC of the above invention consists of a procedure for alarm prediction that sets an Alarm Set Point (ASP) for a critical SLA if there is a predicted network overload at a given TBOL time point based on the horizontal forecast models corresponding to the involved AIs. Further, the AMC consists of an alarm confirmation procedure that confirms the ASP and sets an Operator Violation Alarm (OVA) flag if there is a consistent network overload at successive time intervals based on the combined offline and online predictions.

The AMC of the present invention further comprises of an alarm generation and escalation procedure that generates an alarm if the OVA flag is set to all the pre-specified candidate operators and further escalates the alarm in case of the non-receipt of an acknowledgement for the generated OVA.

The passive agents installed in network elements of the network collect the necessary traffic data related to non-critical SLAs and the OMS Offline Component pulls this data from the network elements during times of low network usage thereby reducing the data flow in the network.

BRIEF DESCRIPTION OF THE DRAWINGS

FIG. A depicts the interaction between the offline and online components of the OMS.

FIG. B depicts the offline functionality of the components of the OMS.

FIG. B1 depicts the Critical SLA (CSLA) Identification Component.

FIG. B2 depicts the SLA Load Analysis Procedure and determination of SATWs.

FIG. B3 depicts the graphical representation of SATWs.

FIG. B4 depicts the steps in the Identification of O-CSLAs.

FIG. B5 depicts the steps in the Node Regionalization Procedure for an SLA

FIG. B6 depicts the Hierarchical Clustering Procedure.

FIG. B7 depicts the graphical representation of the Load due to the SLA and the Identification of Forecast Models.

FIG. B8 depicts the steps in the Model Selection Component.

FIG. B9 depicts the steps involved in the Merging of Analysis Intervals.

FIG. B10 depicts the graphical representation of the Merging of Analysis Intervals.

FIG. B11 depicts the steps in the DTP-wise HUB Computation.

FIG. B12 depicts the steps involved in offline prediction.

FIG. C depicts the online functionality of the components of the OMS.

FIG. C1 depicts the Probe Activation Component.

FIG. C2 depicts the Master Probe Component for the SLSC.

FIG. C3 depicts the Master Probe Component for the VLSC.

FIG. C4 depicts the Slave Probe Component.

FIG. C5 depicts the steps in the Parent Probe Forecast Component for the pth SLA.

FIG. C6 depicts the execution flow of the Alarm Manager Component.

FIG. C6a depicts the steps in the Alarm Prediction module of the Alarm Manager.

FIG. C7 depicts the steps in the Alarm Confirmation module of the Alarm Manager

FIG. C8 depicts the steps in the Alarm Generation and Escalation module of the Alarm Manager.

FIG. D depicts the interaction of the offline and online components during the ATP FIG. E depicts the interaction of the offline and online components during a given DTP within an ATP.

FIG. F1 depicts the structure of the configuration database.

FIG. F2 depicts the structure of the offline details database.

FIG. F3 depicts the structure of the violation and complaints database.

FIG. F4 depicts the structure of the SLA contact database.

FIG. F5 depicts the structure of the network traffic database.

FIG. F6 depicts the structure of the network topology database.

DETAILED DESCRIPTION OF THE PREFERRED EMBODIMENTS

OMS-Offline and Online

The primary objective of the present invention is the creation of a subsystem for the offline identification and real-time monitoring of a select set of SLAs termed as critical SLAs wherein the network traffic generated by the users of a network is bound by the SLAs. FIG. A depicts the Overload Monitoring System along with Offline and Online components.

The offline components of the OverLoad Monitoring System (OMS) 10 of the present invention comprise of a Critical SLA Identification Component, HUB Calculation Component, Region Identifier Component and Forecast Model Component.

The Critical SLA Identification Component 100 of the OMS-offline of the present invention relates to the analysis of network traffic in terms of network load due to the critical SLAs. The objective of this component is to identify a reduced set of SLAs. The Critical SLA Identification Component ensures that only the adequate subset of SLAs are identified for monitoring purposes sand thereby reducing the network monitor-data flow and consequently the load on the network elements.

The Region Identifier Component 200 of the OMS-offline of the present invention comprises of a regionalization procedure to identify clusters based on the contiguity of the network elements and further grouping of the nodes that exhibit similar average load (mean) characteristics into Similar Load Sub-Clusters (SLSCs). Further, a node of each SLSC is identified as Master Node and the rest of the nodes in the SLSC are identified as Slave Nodes. Based on the observation that the clusters in general and sub-clusters in particular exhibit similarity in load characteristics, the analysis of traffic within sub-clusters are carried out at two different pre-defined intervals thereby reducing the monitor-data flow.

The Model Selection Component 300 of the OMS-offline of the present invention comprises of the identification of forecasting models at various time intervals to take into account the traffic fluctuations due to network usage. The need for the interval-based forecasting is based on the observed network usage regularity within intervals. This component uses a forecast procedure to predict the load due to the critical SLAs by applying horizontal and vertical model selection techniques on the historical data. Further, the forecast procedure comprises of an Analysis Interval (AI) Identification Procedure that identifies appropriate forecast models (FM) for each of the AIs.

The HUB Calculation Component 400 of the OMS-offline of the present invention computes the overall network load due to the identified critical SLAs. The monitoring of a select set of SLAs requires the need to forecast the network capacity utilized by these identified SLAs and thereby enabling the prediction of operator violations.

The Prediction Component 500 analyzes the forecasted load due to the critical SLA's using the vertical FM for a pre-specified set of future points in time, based on the Time Before Overload (TBOL) point.

The online components of the OMS 15 of the present invention comprise of the Probe Activation Component, Parent Probe Forecast Component and Alarm Manager Component.

The Probe Activation Component 700 of the OMS-online of the present invention generates parent probes for critical SLAs and activates the pre-installed probes in the Master Node of each SLSC as master probes and the rest of the nodes in each SLSC as Slave Probes.

The Parent Probe Forecast Component 900 of the OMS-online of the present invention forecasts the load due to the associated Critical SLA at a future time point Time Before OverLoad (TBOL) units away from the time of forecast and communicates the forecasted load to the Alarm Manager Component (AMC). The Parent Probe Forecast Component further identifies the underlying trend of the forecasted load pattern and also communicates the trend behavior to the AMC.

The Alarm Manager Component 950 of the OMS-online of the present invention consists of an Alarm Prediction Component, an Alarm Confirmation Component, and an Alarm Generation and Escalation Component, to determine and generate OV alarms at a future time point and further, escalate the alarms in case an acknowledgement for the alarms is not received. The objective of the alarm generation is to help the provider in taking corrective steps a priori to resolve potential network bottlenecks.

The OMS-Offline Component is invoked periodically and there are two distinct periods, Analysis Time Period (ATP) 20 and Detailed Time Period (DTP) 25. The functions of Critical SLA Identification and Region Identification are performed periodically at ATP intervals while the functions of HUB computation and Forecast Model identification is performed at DTP intervals.

The network region traffic analysis is performed at two distinct configurable clocks, namely, the master clock and the Slave clock. The master clock frequency (MCF) 30 is much higher than the Slave clock frequency (SCF) 35 to reduce the monitor-data flow across the network. The Master Nodes of each SLSC communicates the SLSC load data to one or more parent probes periodically at MCF intervals.

The OMS system makes use of multiple databases to store and retrieve SLA and Network related data. The Configuration Database 40 contains the information related to the various configurable entities related to SLAs, periodicity, clock frequencies, upper and lower bounds. FIG. F1 is a description of the Configuration Database. The Offline Details database 45 contains the information required for online monitoring of critical SLAs and alarm generation including the set of Critical SLAs, HUBs, AIs and Forecast Models. FIG. F2 is a description of this database. The above two databases are updated and maintained by OMS-Offline component. The Violation and Complaints Database 50 contains the information pertaining to past violations and complaints related to SLAs. FIG. F3 is a description of this database. The SLA contract database 55 contains the information related to the SLA contracts. FIG. F4 is a description of this database. The Network Topology database 60 contains the information related to the past network traffic. FIG. F5 is a description of this database. The Network Topology database 65 contains the information related to the network topology. FIG. F6 is a description of this database. The above 6 databases are external to the OMS system and the indicated entities are the entities that are of interest to the present invention.

OMS—Offline functionality

FIG. B is a block diagram depicting the interaction among different components and databases involved in the offline functionality of the OMS in accordance with the preferred embodiment of the present invention.

Critical SLA Identification Component

FIG. B1 describes, schematically, the offline critical SLA identification component of the OMS. Critical SLAs for monitoring and forecasting purposes are determined by identifying four types of SLAs by using automatic SLA selection technique 100 based on an optimization procedure, automatic SLA selection option 160 based on past violation history of the SLAs, a manual SLA selection option 170 based on operator preferences, and manual selection of new SLAs 180.

The SLA related data required for the identification and selection of Critical SLAs is based on the information contained in the databases 40-65.

The Automatic SLA selection component 100 uses an optimization procedure to determine the first set of critical SLAs, namely, O-CSLAs. These are the SLAs that are within their contractual bounds and may demand additional bandwidth during the times of network congestion.

The SLA selection based on violations and complaints (V-CSLAs) component, 170, identifies the second set of critical SLAs for monitoring based on the past SLA violations and complaints. This component further analyses violation data related to SLAs and ranks the SLAs based on the frequency of violation in the decreasing order. The component, 170, also analyses SLA related complaint data, and SLAs are ranked based on the frequency of complaints pertaining to a particular SLA in the decreasing order. The configurable number of SLAs are selected from the above ranked SLAs. The motivation for identifying these SLAs is to reduce the churn rate of the operator by monitoring closely those subscribers who have been experiencing problems while using the network infrastructure.

The Manual SLA selection component (M-CSLAs), 160, identifies the third set of critical SLAs based on a manual selection by the operator. The Manual SLA selection component allows the operator to select SLAs based on operator's own criteria from the overall list of available SLAs.

The New SLA component 180, (N-CSLAs), identifies the fourth set of critical SLAs based on SLAs that are newly introduced into the system. Operator selects some of these new SLAs for monitoring purposes based on the prior knowledge about the subscribers. 170, 180 provide additional flexibility to the operator to selectively monitor certain "important" SLAs.

The final set of critical SLAs is the union of the SLAs obtained from the automatic SLA selection technique based on the optimization procedure (O-CSLAs), past violation history of SLA (V-CSLAs) the manual selection based on operator preference (M-CSLAs) and new SLAs (N-CSLAs).

The procedure for the identification of O-CSLAs is based on the analysis of the past network traffic over ATP where ATP is a configurable analysis time period. ATP is divided into smaller ATWs and in each ATW the network traffic related to an SLA is analyzed. In order to arrive at a computationally efficient load analysis procedure, the analysis is restricted to select ATWs termed as Sensitive Analysis Time Windows (SATWs).

FIG. B2 is a flowchart depicting the SLA Load Analysis Procedure and determination of SATWs.

In step 105, the value of ATP is determined.

In step 110, ATP is partitioned into contiguous ATWs. Then, in Steps 115 and 120, the load due to an SLA is computed over ATW by observing the time-stamp in the packets related to the SLA.

In step 130, a Load Ranking Procedure determines the combined aggregate load due to all the SLAs across each ATW and further ranks the ATWs in the decreasing order of the combined aggregated load.

In step 135, a configurable number of ATWs from the above rank-ordered set, termed as SATWs, are selected. SATWs are ATWs wherein the combined load due to the set of SLAs is relatively high and hence these are the time windows of interest.

FIG. B3 is a graphical representation of the identification of the SATWs. The figure shows the load due to four SLAs, SLA1-SLA4 and the graph B3-1 shows the aggregated load.

Based on the combined aggregated loads due to the SLAs, ATWs B3-2 and B3-3 are the candidate SATWs.

FIG. B4 is a flowchart that describes the O-CSLA Identification Procedure.

In step 135, an Optimization Procedure is used to determine optimal weights for the set of SLAs at each SATW. The objective of the optimization procedure is to identify a minimum number of SLAs whose minimum variation in the load pattern can cause congestion in the network.

The optimization routine varies the load due to the set of the SLAs in each SATW based on the constraint that the individual load variations due to SLAs do not exceed the allowable upper bound for that SLA, $(\Delta_i)$. $\Delta_i$ is the maximum difference between consecutive peaks in the SATW for the SLA. The second constraint is imposed to ensure that the analysis is when the network is overloaded.

Let $x_1 \ldots x_S$ represent the set of SLAs under consideration.

Let $b_1 \ldots b_S$ represent the average load due to each SLA over SATW.

Let L represent the overall network capacity

The optimization problem with respect to SATW is stated as follows:
Minimize $$\sum_{i=1}^{s} x_i$$

Subject to the following constraints $$\sum_{i=1}^{s} b_i x_i > L$$

and
$0 \leq (b_1 x_1 - b_1) \leq \Delta_1$
$0 \leq (b_2 x_2 - b_2) \leq \Delta_2$
●
●
$0 \leq (b_S x_S - b_S) \leq \Delta_S$ As a result of the optimization procedure, the set of SLAs over the identified SATWs are associated with optimal weights (reflected by their $x_i$ values).

In step 135, a Filtering Procedure is applied to the set of SLAs to filter out those SLAs that have crossed their SUBs, in any one of the SATWs.

In step 150, the aggregated weight for each SLA across the SATWs is determined. The SLAs are further ranked in the increasing order of aggregated weights.

In step 155 a configurable number of the above ranked SLAs are selected as O-CSLAs.

Region Identifier Component

The region identifier component of the offline monitoring system aims at reducing the monitor-data flow across the network, by clustering the nodes in the network. The regionalization of the nodes is SLA-specific and these SLA-specific nodes are further clustered (sub-clusters) based on their average load. Representative nodes are identified for each of these sub-clusters and are termed as Master Nodes (MNs). These MNs ensure that the monitor-data flow across the network is reduced.

FIG. B5 is a flowchart representing the Node Regionalization Procedure for an SLA.

In Step 200, physically contiguous regions for the nodes in the network are identified based on a pre-defined hop metric from identified seed nodes. In step 200-a, the number of physically contiguous clusters (k) to be formed is obtained from the configuration database. Then in step 200-b, k nodes are identified as seed nodes in the k clusters, such that the k seeds are mutually farthest apart from each other. In step 200-c, a node is classified into any one of the k clusters based on the node's distance (hop metric, h) from the seeds of each of the k clusters and further placed into the cluster whose seed is <=2h hops away from the node. In case of a tie between clusters, the node becomes a member of that cluster whose members (including the seed) are at a minimum distance from the node. (based on the node's proximity to the members of the cluster). The above steps are repeated till all the nodes in the network have been classified.

Step 205 of the Node Regionalization Procedure forms CSLA-specific regions for each critical SLA by extracting only those nodes that carry the SLA-related traffic from the above contiguous regions of nodes. Note that there are multiple regions associated with each of the critical SLAs.

In Step 210 of the Node Regionalization Procedure, a hierarchical clustering procedure is employed to form Similar Load Sub-Clusters (SLSCs) based on the similarity (correlation) exhibited in the load pattern of the nodes of the SLA, within the SLA-contiguous region.

In step 210-a, the desired number of granularity levels (g) for hierarchical clustering of SLA specific clusters is obtained from the configuration database.

In step 210-b, initially, the load vectors for the nodes of the SLA are computed at the highest granularity level (i=1).

In steps 210-c and 210-d, the nodes related to the SLA are classified into SLSC's based on the correlation between the load vectors by starting an initial cluster with a random node and further each of the nodes is classified into one of the existing clusters in case of high correlation or by starting a new cluster otherwise.

In step 201-e, steps 210-a-210-d are repeated at increasing granularity levels till SLSC's for the SLA have been formed at the desired granularity level. FIG. B6 depicts the hierarchical clustering process at various levels of i.

In step 210-f, the Node Regionalization Procedure comprises of a procedure to identify a node in the centroid position of the SLSC as the Master Node (MN) and the other nodes are identified as Slave nodes.

In step 210-g, the Node Regionalization Procedure comprises of a procedure that combines all the singleton clusters obtained from the hierarchical clustering procedure into a cluster of singletons called as VLSC (Variable Load Sub-Clusters).

FIG. B6 is a diagrammatic representation of the Hierarchical Clustering Procedure.

In step 215, the Node Regionalization Procedure identifies a randomly selected node as the MN of the VLSC and the other nodes in the VLSC are identified as Slave nodes of the VLSC.

Model Selection Component

Online OMS makes use of a forecasting model to predict OVs. There are multiple forecasting models such as ARIMA models, mean-based models and median based models. Model selection refers to the identification of one of the forecasting models that characterizes the traffic data with minimum forecasting error. Therefore, the accuracy and validity of the data collected plays a very important role in model building. The Forecast Model Component of the OMS-offline of the present invention comprises of the identification of forecasting models at various time intervals to take into account the traffic fluctuations due to network usage. The need for the interval-based forecasting is based on the observed network usage regularity within intervals.

FIG. B7 is a graphical representation of the load due to the SLA and the Identification of Forecast Models.

FIG. B8 is a flowchart describing the offline Model Selection Component.

In step 300, the Offline Forecast Procedure divides the ATP into sets of DTP sub-intervals (Dij's) and the Dij's into k Model Windows (MWs).

In step 305, the correlation among consecutive MWs over the interval of <ts,te>, across the set of ATP's is determined. Initially, ts=t0 and te=ts+MW.

Step 310 determines the correlation among the MWs and checks if all MWs in the DTP sub-interval have been exhausted. (te+MW<=DTP). If the correlation among the MWs is high and te+MW<=DTP, then the end time-point ($t_e$) is advanced to the next MW (te=te+MW), and step 305 is repeated, else step 315 is performed.

In step 315, <ts,te-MW> is identified as an Analysis Interval (AI) and steps 305-310 are repeated until the condition te+MW>DTP has been satisfied.

Step 320 determines if all DTPs across ATPs have been analyzed. If not, the next DTP sub-interval is analyzed, by advancing j in $D_{ij}$ by 1 and step 305 is repeated, else step 325 is performed.

In Steps 325-330 and 335-340, the SFM is applied to each of the identified AI's using two distinct techniques namely, Horizontal BFM Selection Technique and Vertical BFM Selection Technique.

In the Horizontal BFM Selection Technique, the SFM is applied to each of the identified AI's in the last $D_{ij}$. The predicted values for the last $D_{ij}$ for each AI are obtained from each model belonging to the SFM, and these values are compared with the actual values from the last $D_{ij}$. The FM that generates the least model error is selected as $BFM_h$ for the AI.

In the Vertical BFM Selection Technique, the SFM is applied to each AI across the past $D_{ij}$'s to generate predictions for the last Dij, by considering a sufficient set of points in the AI for prediction purposes. The predictions generated by each of the models in the SFM over the last Dij are compared with actual data from the last Dij, and the FM that generates the least model error for the AI is selected as $BFM_v$ for the AI.

In step 345, steps 325-330 and 335-340 are independently repeated for the remaining $D_{ij}$'s to determine BFMs ($BFM_v$, $BFM_h$) for the AI's.

The Model Selection Component further comprises of a Least Merge Error (LME) procedure to merge consecutive AIs identified for a DTP sub-interval, when the number of AIs are more than a configurable pre-specified value.

FIG. B9 is a flowchart describing the steps involved in the Merging of Analysis Intervals and FIG. B10 is a graphical representation of Merging of Analysis Intervals procedure.

In step 345, the number of AI's (AI_NUM) are compared with AI_MAX. Steps 345-365 are repeated until AI_NUM<=AI_MAX is satisfied.

In step 350, the identified Analysis Intervals ($AI_i$'s) are combined from left to right to form Combined Intervals ($CI_i$'s).

In step 355, the identified $BFM_v$'s ($BFM_{v(i)}$ and $BFM_{v(i+1)}$) and $BFM_h$'s ($BFM_{h(i)}$ and $BFM_{h(i+1)}$) corresponding to the first two AI intervals ($AI_i$, $AI_{i+1}$) are applied to the first CI.

In step 360, the BFM for the $i^{th}$ CI is determined by computing the merge error by applying $BFM_{v(i)}$, $BFM_{v(i+1)}$, $BFM_{h(i)}$, and $BFM_{h(i+1)}$ independently across CI and selecting the model that generates the Least Merge Error (LME) as the BFM for the CI.

In step 365, step 355 is repeated if there are more CI's to be analyzed. When all CI's have been analyzed, step 370 is performed.

In step 370, the BFM that generated the LME among all the CI's is identified as the new AI and the process is repeated until the condition in step 345 is satisfied.

HUB Calculation Component

FIG. B11 is a flowchart that depicts schematically, the sequence of events that take place in the determination of the Hard Upper Bound (HUB) for the set of critical SLAs.

The HUB for bandwidth is defined as the difference between the overall network capacity (NWC) and the forecasted usage upper bound (UUB) for all the non-critical SLAs, wherein the overall network bandwidth is statically determined based on network topology.

In step 400, the HUB calculation procedure analyses the network traffic to generate traffic data specific to non-critical SLAs (X-SLAs).

In step 405, the load due to the X-SLAs is forecasted over the DTP interval. In step 410, the forecasted load due to a given X-SLA is partitioned, by dividing DTP into H sub-intervals.

In step 415, the peak load (UUBi) during the $i^{th}$ (i=1 ... H) sub-interval in the DTP is determined for the N-CSLA. In step 420, step 415 is repeated for all sub-intervals for the X-SLA.

In step 425, steps 415-420 are repeated for all the X-SLAs under consideration. In step 430, the HUB value for the $i^{th}$ sub-interval across the set of X-SLAs is computed.

In step 435, HUB values across the set of X-SLAs for all sub-intervals during the DTP are computed.

Prediction Component

FIG. B 12 is a flowchart describing the steps involved in Offline Prediction. The Offline Prediction Component analyzes the forecasted load due to CSLAs using $BFM_v$, for a pre-specified set of future points in time based on the Time Before Overload (TBOL) points.

In step 500, the TBOL Time Points of Prediction (TTPP) set is defined, by considering 2k+1 time points that are ATW apart, around TBOL.

In step 505, the Offline Prediction Component uses $BFM_v$, corresponding to the AI related to the current MCF, to predict load across MCF at ATW intervals for each CSLA.

In step 510, the overall network load (OFPL) due to all critical SLAs at the TBOL ($q^{th}$) time-point in the DTP is calculated as below.

$$OFPL_q = \sum_{p=1}^{s} L^F_{pq}$$

Here, $L^F_{pq}$ is the computed load, due to the $p^{th}$ CSLA across the MCF (containing the qth time point), at the TBOL ($q^{th}$) time-point, and $OFPL_q$ is the load due to all CSLAs at the $q^{th}$ time point.

In Step 515, the Offline Prediction Component compares the overall network load $OFPL_q$ at TBOL, calculated in step 510, with that of $HUB_i$, where the TBOL time point belongs to the $i^{th}$ sub-interval. If $OFPL_q$ is less than or equal to $HUB_i$, then the Offline Prediction Component forms (2k+1) $p^{th}$ SLA tuple of zeros and stores this in the Offline Details Database. (Step 520).

In step 525, as the computed load exceeds the HUBS, the Offline Prediction Component checks if the load $L^F_{pq}$ due to the $p^{th}$ CSLA is within the threshold value contractually agreed upon in the SLA (SUB) and whether the usage pattern of the SLA exhibits an upward trend (using a trending procedure) for all the 2k+1 time-points in the TTPP set.

In step 530, the Offline Prediction Component forms an offline 2k+1-pth CSLATuple of 1's and 0's and stores the tuple information in the Offline Details Database.

In step 535, the Offline Prediction Component repeats steps 525-530 for all CSLAs.

In step 540, steps 505-535 are repeated for consecutive MCFs till the end of DTP is reached.

In step 545, steps 500-540 are repeated for remaining DTPs across ATP.

OMS—Online functionality

FIG. C is a block diagram showing different components involved in the online functionality of OMS in accordance with a preferred embodiment of the present invention.

The online functionality of the OMS of the present invention performs online near-optimal traffic analysis by generating distinct parent probes for each CSLA and activates Universal Network Probes (UNPs) that are pre-installed in the network nodes.

The UNP of the online functionality of the OMS of the present invention further plays role of Master Network Probes (MNP) for a subset of CSLAs and plays the roles Slave Network Probes (SNP) for another subset of CSLAs.

It is further the object of the OMS to perform network region traffic analysis based on two distinct configurable clocks, namely, the Master Clock and the Slave Clock wherein the Master Clock Frequency (MCF) is much higher than the Slave Clock Frequency (SCF) to facilitate reduced monitor-data flow across the network.

It is yet a further object of the OMS of the present invention to perform online near-optimal traffic analysis using the pre-installed UNPs in the identified Master Node of an SLSC/VLSC for a particular SLA.

It is still a further object of the OMS of the present invention to perform online near-optimal traffic analysis using the pre-installed UNPs in the identified Slave Nodes of an SLSC/VLSC for a particular SLA.

It is yet a further object of the OMS of the present invention to provide a procedure wherein the master probe dynamically computes the load on the Slave Nodes in the associated SLSC periodically at MCF interval.

It is still another object of the OMS of the present invention to provide a procedure wherein the parent probe forecast component predicts the load and underlying trend of the predicted load pattern, due to the associated CSLA at a future TBOL time point Yet another object of the OMS of the present invention is to provide a procedure wherein the Alarm Manager Component predicts, confirms and generates alarms for operator violations based on consistency of alarms and further escalates in case of no acknowledgement for the generated alarms.

The aforesaid objects and further objects, functionalities and advantages of the present invention will be discussed below, encompassing detailed description of the preferred embodiments of the present invention with the help of drawings and referred numerals in the said drawings.

Probe Activation Component

The Probe Activation Component 700 of FIG. C of the OMS detailed in FIG. C1 performs near-optimal traffic analysis by using the pre-installed UNPs across the network.

In step 710, the Probe Activation Component generates a unique parent probe for each critical SLA to collect and forecast relevant time-stamped load data of the associated critical SLA.

In step 715, the Probe Activation Component reads the cluster specific information i.e. the SLSC- and VLSC-specific information determined in the offline system from the Offline Analysis DB 45.

In step 720, the Probe Activation Component based on the SLSC information read in step 715 further identifies, for each SLSC, a network element as the MN that performs the role of master probe and communicates the role type to the corresponding pre-installed UNP in MN.

The Probe Activation Component further identifies the CSLA, which needs to be monitored by a master probe, and passes that as a parameter to the pre-installed UNP that performs the role of master probe.

The Probe Activation Component further reads the master clock frequency from the configuration DB and passes the MCF as a parameter to the master probe based on which the master probe communicates the collected and estimated monitor-data for the associated SLSC to the parent probe.

In step 725, the Probe Activation Component based on the SLSC information read in step 720 further identifies the network elements which perform the role of a slave probe and further communicates the role type to the corresponding pre-installed UNP.

The Probe Activation Component further identifies CSLA that needs to be monitored by the slave probe, and passes that as a parameter to the pre-installed UNP that performs the role of slave probe.

The Probe Activation Component further identifies the master probe for the slave probes in an SLSC and communicates the identified master probe as a parameter to the slave probes to enable the communication of collected monitor-data to the master probe.

The Probe Activation Component further identifies the SCF and passes the SCF as a parameter to the Slave probes based on which a slave probe communicates the collected monitor-data to the associated master probe at periodic intervals.

In step 727, the Probe Activation Component repeats the said procedure of identifying master and slave probes and further communicating parameters to master and slave probes for the all the SLSCs identified for all CSLAs during offline analysis to aid the master and slave probes in the corresponding network elements to generate network monitor-data.

In step 730 of the said Probe Activation Component, based on the VLSC information read in step 720, further identifies the MN that performs the role of master probe and further communicates the role type to the corresponding pre-installed UNP in MN.

The Probe Activation Component further identifies the CSLA that needs to be monitored by the VLSC master probe, and passes that as a parameter to the pre-installed UNP that performs the role of master probe.

The Probe Activation Component further passes the MCF as a parameter to the master probe based on which the master probe communicates the collected monitor-data to the parent probe.

In step 735, Probe Activation Component based on the VLSC information read in step 720 further identifies the network elements that perform the role of slave probes and communicates the role type to the corresponding pre-installed UNPs.

The Probe Activation Component further identifies the CSLA that needs to be monitored by the slave probe, and passes that as a parameter to the pre-installed UNP that performs the role of slave probe.

The Probe Activation Component further identifies the master probe for the slave probes and communicates the identified master probe as a parameter to the slave probes and the slave probes communicate the collected monitor-data to the master probe The Probe Activation Component further passes the MCF as a parameter to the slave probes based on which the slave probes communicate the collected monitor-data to the master probe. In case of slave probes that belong to a VLSC, the master probe does not estimate the load of the slave probes, as the nodes in the VLSC do not exhibit similarity in the load pattern.

In step 737, the Probe Activation Component repeats the said procedure of identifying master and slave probes and further communicating parameters to master and slave probes for the all the VLSCs identified for all CSLAs during offline analysis to aid the master and slave probes in the corresponding network elements to generate network monitor-data.

Master Probe Component of SLSC

The Master Probe Component 750 of FIG. C of the OMS detailed in FIG. C2, computes the load due the nodes in an SLSC based on the monitor-data related to the master node and the associated slave nodes.

In step 755, the Master Probe Component receives role type from the parent probe as a parameter, using which the UNP performs the role of Master Node for an SLSC and henceforth the UNP is referred as the Master Network Probe (MNP).

Further, the Master Probe Component receives SLA identifier information from the parent probe, which is used by the identified MNP to collect data, related to the designated CSLA.

Further, the Master Probe Component receives the MCF parameter from the parent probe, which is used by the identified MNP to communicate data related to the designated CSLA at MCF intervals. The said parameters are received periodically at ATP intervals.

In step 760, the Master Probe Component monitors all packets passing through its node and collects the time-stamped traffic measurements related to the designated CSLA.

In step 765, the Master Probe Component further computes the load due to its node based on time-stamped traffic measurements collected at its node at ATW intervals.

In step 770, the Master Probe Component further receives slave node load data from slave nodes at SCF intervals.

In step 775, the Master Probe Component, further, in case of no recent update from a slave probe, estimates the load due to the slave node, at ATW intervals, based on the recent time-stamped SLA load data received from the slave probe and the proportional change in the master node load. The said estimation is repeated for all slave probes in the SLSC associated with the master node. The said estimation procedure is based on the fact that the master node and the Slave nodes in an SLSC exhibit a similar load characteristic. Further, in step 780, the Master Probe Component computes the overall load due to its SLSC by aggregating the load computed with respect to the master node and the associated slave nodes. Based on the similarity in the load pattern of the nodes in an SLSC, the overall aggregated load is a good approximation of the actual SLSC load.

In step 785, Master Probe Component further communicates the aggregated load due to its SLSC to the parent probe at master clock frequency intervals.

In step 790, the Master Probe Component further backs up the load information gathered about its SLSC to a pre-specified location at regular intervals.

Master Probe Component of VLSC

The Master Probe Component 800 of FIG. C of the OMS detailed in FIG. C3 computes the load due the nodes in an VLSC based on the monitor-data related to the master node and the associated slave nodes.

As VLSC is a cluster based on singletons, all the nodes in a VLSC collect data at MCF intervals and the identified master probe collects and communicates the load due to the VLSC at MCF intervals.

In step 805, the Master Probe Component receives role type from the parent probe as a parameter, using which the UNP performs the role of master Node for a VLSC and henceforth the UNP is referred as the Master Network Probe (MNP).

Further, the Master Probe Component receives SLA identifier information from the parent probe, which is used by the identified MNP to collect data, related to the designated CSLA.

Further, the Master Probe Component receives MCF parameter from the parent probe, which is used by the identified MNP to communicate data related to the designated CSLA at MCF intervals. The said parameters are received periodically at ATP intervals.

In step 810, the Master Probe Component monitors all packets passing through its node and collects the time-stamped traffic measurements related to the designated CSLA.

In step 815, the Master Probe Component further computes the load due to its node based on time-stamped traffic measurements collected at its node at ATW intervals.

In step 820, the Master Probe Component further receives Slave node load data from Slave nodes at MCF intervals.

Further, in step 825, the Master Probe Component computes the overall load due to its VLSC by aggregating the load computed with respect to the master node and the computed load received from the associated Slave nodes at MCF intervals.

In step 830, Master Probe Component further communicates the aggregated load due to its VLSC to the parent probe at MCF intervals.

In step 835, the Master Probe Component further backups the load information gathered about its VLSC to a pre-specified location at regular intervals.

Slave Probe Component

The Slave Probe Component 850 of FIG. C of the OMS detailed in FIG. C4 computes the load with respects to its node based on the monitor-data related to its node.

In step 855, the Slave Probe Component receives role type from the parent probe as a parameter, using which the UNP performs the role of Slave Node for an SLSC/VLSC and henceforth the UNP is referred as the Slave Network Probe (SNP).

Further, the Slave Probe Component receives SLA identifier information from the parent probe, which is used by the identified SNP to collect data, related to the designated CSLA.

Further, the Slave Probe Component receives SCF parameter from the parent probe, which is used by the identified SNP to communicate data related to the designated CSLA at SCF intervals. The said parameters are received periodically at ATP intervals.

In step 865, the Slave Probe Component monitors all packets passing through its node and collects the time-stamped traffic measurements related to the designated CSLA.

In step 870, the Slave Probe Component further computes the load due to its node based on time-stamped traffic measurements collected at its node at ATW intervals.

In step 870, the Slave Probe Component further communicates the aggregated load due to its node to the associated MNP at SCF intervals.

In the case of the Slave Probe Component related to a slave node in a VLSC, the SCF is the same as MCF.

Parent Probe Forecast Component

The Parent Probe Forecast Component 900 depicted in FIG. C of the OMS comprises of forecasting the load due to CSLAs at a pre-specified set of future points in time called Time before Overload point (TBOL) by analyzing the time-stamped CSLA load data received from the associated MNPs at MCF intervals.

FIG. C5 is a description of the parent probe forecast component for the $p^{th}$ SLA.

In step 905, the said Parent Probe Forecast Component receives the load data due the associated $p^{th}$ CSLA from the associated MNPs.

In step 910, a check is made to determine if the OVA flag is set for the $p^{th}$ CSLA. If so, the TBOL point is defined as the prediction time point and steps 920-A -920-F are performed. This computation is being performed in order to be able to compute the overall network load due to CSLAs at each MCF interval.

In step 915, the Parent Probe Forecast Component defines TBOL Time Points of Prediction (TTPP) set . The TTPP set comprises of 2k+1 time points that are ATW apart and is formed around TBOL by taking k time points before and after TBOL. When an alarm is predicted by the Alarm manager, the corresponding TBOL point is set as Alarm Set Point (ASP) and the corresponding TTPP set is transformed to an ATPP set. For a particular critical SLA, there are at most a pre-specified number, NASP, of ATPP sets.

In step 920, the Parent Probe Forecast Component applies $BFM_h$ generated during offline analysis, for prediction at the TBOL point, to predict $L_{pq}$, the load due to the $p^{th}$ CSLA at the $q^{th}$ point in the TTPP set for all q=1, 2, . . . , 2k+1.

Steps 920-A-920-E describe the above procedure in detail.

In step 920-A, the prediction starts at the prediction time point $P_t$ where $P_t$ is set to current time point $C_t$ initially. In step 920-B, $P_t$ is advanced by one ATW interval. Then, in step 920-C, the AI corresponding to $P_t$ is identified, wherein the AI's are determined during the offline analysis. In step 920-D, the $BFM_h$ corresponding to the AI, is identified. In step 920-E, the load $L_{pq}$ is predicted using the said $BFM_h$. In step 920-F, steps 920-A-920-E are repeated till $P_t$ advances to the $(2k+1)^{th}$ TTPP/ATPP time point.

In step 922, Parent Probe Forecast Component determines the usage pattern trend and further sets $T_{pq}$ as 1 if an upward trend is exhibited by the load due to $p^{th}$ CSLA and 0 otherwise, for all q=1, 2, . . . 2k+1 for the q.

In step 924, the load ($L_{pq}$) and trend ($T_{pq}$) data determined in the previous steps for the $p^{th}$ CSLA at all q, q=1, 2, . . . 2k+1, of TTPP set is communicated to the Alarm Manager.

In steps 925-945, the analysis of each of the NASP ATPP sets is carried out.

In step 925, a check is made to determine if the ATPP set is defined. If not, step 945 is performed, else step 930 is performed.

In step 930, the Parent Probe Forecast Component applies $BFM_h$ generated during offline analysis to predict $L'_{pq}$, the load due to the $p^{th}$ CSLA at the $q^{th}$ point in the ATPP set for all q=1, 2, . . . , 2k+1.

In step 935, Parent Probe Forecast Component determines the usage pattern trend and further sets $T'_{pq}$ as 1 if an upward trend is exhibited by the load due to $p^{th}$ CSLA and 0 otherwise, for all q=1, 2, . . . 2k+1 for the q.

In step 940, the load ($L_{pq}$) and trend ($T_{pq}$) data determined in the previous steps for the $p^{th}$ CSLA at all q, q=1, 2, . . . 2k+1, is communicated to the Alarm Manager.

Step 945 is repeated NASP times, by incrementally advancing the ATPP set.

Step 950 repeats steps 910-945 for all CSLA's.

Alarm Manager Component

The Alarm Manger Component (AMC) of the OMS depicted in FIG. C6-FIG. C8 comprises of three important modules, namely, Alarm Prediction, Alarm Confirmation and Alarm Generation & Escalation with respect to operator violation alarms. The Alarm prediction component sets an ASP, for a CSLA, if there is a predicted network overload at a given TBOL time point based on horizontal prediction model. The Alarm Confirmation component confirms the ASP and sets Operator Violation Alarm (OVA) Flag, if there is a consistent overload at successive NASP MCF intervals. The Alarm Escalation Component generates the alarm if OVA flag is set and further escalates in case no acknowledgement is received for the generated alarm. The figure FIG. 6C depicts the execution flow among the various modules of AMC FIG. C6a describes Alarm Prediction module of AMC.

In step 955, the Alarm Prediction module receives the load data $L_{pq}$ due to all CSLAs at all q points of the (TTPP) set, (q=1, 2 . . . 2k+1) at MCF intervals. In step 960, the overall $$OFPL_q = \sum_{p=1}^{s} L_{pq}^{N}$$

load due to all CSLAs at the $q^{th}$ time point, where q corresponds to the TBOL time point is calculated as below.

In step 965, the Alarm Prediction module compares the overall network load ONPLq calculated in step 960 with $HUB_i$ (HUB value for the $i^{th}$ sub-interval) determined in the offline system, where i is the $i^{th}$ sub-interval containing TBOL time point. The HUB for bandwidth is the difference between the overall network capacity (NWC) and the forecasted usage upper bound (UUB) for all the non-critical SLAs.

If $ONPL_q$ is less than or equal to $HUB_i$ then Alarm Prediction module stops further analysis, as the network is not overloaded.

In step 970, Alarm Prediction module checks whether OVA flag is set for $p^{th}$ CSLA. If set the Alarm Prediction module stops further analysis of $p^{th}$ CSLA as the $p^{th}$ CSLA is already in the predicted list and continues with the processing the next CSLA.

In step 975, as the computed load exceeds the $HUB_i$, the Alarm Prediction module checks if the load $L_{pq}$ due to $p^{th}$ CSLA at the $q^{th}$ time point in the TTPP set, is within the threshold value contractually agreed upon in the SLA (SUB) and further checks whether the usage pattern of the CSLA exhibits an upward trend using a trending procedure. The Alarm Prediction module checks the said condition for all q=1, 2 . . . 2k+1.

In case of failure of one of the above-mentioned conditions for any one q, the Alarm Prediction module stops further analysis of $p^{th}$ CSLA as the $p^{th}$ CSLA may not cause any operation violation and performs step 985.

In step 977, the Alarm Prediction module forms an online 2k+1–pth CSLATuple of 1's as the operator violation condition is satisfied for all q=1, 2 . . . 2k+1.

In step 978, the Alarm Prediction module determines 2k+1-AlarmTuple by combining (AND ing) online 2k+1-pth CSLATuple obtained in the previous step with that of offline 2k+1-pth CSLATuple determined during offline analysis. Both offline and online tuple correspond to the same TBOL time point of the $p^{th}$ CSLA.

In step 979, the Alarm Prediction module checks whether some k+1 values in the 2k+1-AlarmTuple obtained in the previous step are 1's.

In case the combined 2k+1-AlarmTuple contains more than k+1 0s, the Alarm Prediction module stops further analysis of $p^{th}$ CSLA and performs step 985

In step 980, as combined 2k+1-AlarmTuple contains k+1 1's, Alarm Prediction module sets the corresponding TBOL as ASP and further transforms the TTPP set to ATPP set for the $p^{th}$ CSLA at that MCF In step 985, the Alarm Prediction module repeats steps 970-980 for all the critical SLAs.

The figure FIG. C7 depicts Alarm Confirmation Module of AMC.

In step 1000, the Alarm Confirmation module checks whether the ATPP set for the $p^{th}$ CSLA is defined. Further, in step 1005, the module receives the load data $L'_{pq}$ and trend values from parent probe forecast component for the $p^{th}$ CSLA, for all q=1, 2 . . . 2k+1 in ATPP set.

In Step 1007, the Alarm Confirmation module checks if the load $L'_{pq}$ due to pth CSLA at the qth time point in the ATPP set, is within the threshold value contractually agreed upon in the SLA (SUB) and further checks whether the usage pattern of the CSLA exhibits an upward trend using a trending procedure. The Alarm Confirmation module checks the said condition for all q=1, 2 . . . 2k+1.

If the above-mentioned two conditions are met for any one q, in step 1010, the Alarm Confirmation module forms an online 2k+1-pth CSLATuple with the value as 1 if operator violation condition is met and 0 otherwise.

In step 1015, the Alarm Confirmation module determines 2k+1-AlarmTuple by combining (AND ing) online 2k+1-pth CSLATuple obtained in the previous step with that of offline 2k+1-pth CSLATuple determined during offline analysis. Both offline and online tuple correspond to the same TBOL time point of the $p^{th}$ CSLA.

In step 1020, the Alarm Confirmation module checks whether any entry in the 2k+1-AlarmTuple obtained in the previous step contains 1.

In case all entries in the combined 2k+1-AlarmTuple are 0, the Alarm Confirmation module undefines the corresponding ATPP set for the $p^{th}$ CSLA and continues with the processing of the remaining CSLAs.

In step 1025, the Alarm Confirmation module repeats steps 1000-1025 NASP times for all the defined ATPP sets.

In step 1030, the Alarm Confirmation module checks whether the least recent ATPP set is defined. If the least recent ATPP set is defined then in step 1035, the alarm confirmation module further sets the Operator Violation Alarm (OVA) flag for the pth CSLA and undefines all ATPP set for that CSLA and performs step 1040. In case of the least recent ATPP set is not defined, the alarm confirmation module stops analysis of $p^{th}$ SLA, and performs step 1040.

In step 1040, the steps 1005-1035 is repeated for all CSLAs.

The figure FIG. C8 depicts the Alarm Generation & Escalation module.

In step 1050, the Alarm Generation & Escalation module reads the candidate operator information from the configuration database and generates operator violation alarms to the said candidate operators.

In step 1055, Alarm Generation & Escalation module generates the first-level alarms to first set of candidate operators, for all the CSLAs for which OVA flag is set.

In step 1060, the Alarm Generation & Escalation module further checks whether acknowledgement is received from those first set of candidate operators for the first-level alarms.

In case of receipt of acknowledgement within a pre-specified acknowledgement time (AT), the Alarm Generation & Escalation module further checks network overload condition in step 1065 after a pre-specified Mean Time To Repair (MTTR) time. In case network overload is observed in step 1070, the Alarm Generation & Escalation module generates operator alarm again, for pre-specified number of times read from the configuration database, before the same is logged for further action In case of overload is not observed in step 1075, the Alarm Generation & Escalation module resets the OVA flag and further in step 1077, generates an SLA Recovery Notification (SRN) to the first set of candidate operators and continues with the processing of remaining CSLAs.

In case acknowledgement receipt is not received within pre-specified AT, in step 1080, the Alarm Generation & Escalation module further checks for the availability of the next set of candidate operators. If the next set of candidate operators is available, then in step 1085, Alarm Generation & Escalation module escalates by sending second-level alarms to the next set of candidate operators. If the next set of candidate operators is not available, in step 1090, the Alarm Generation & Escalation module logs the alarm information for further action and continues with the processing of remaining CSLAs.

Interaction between Offline and Online

| Offline Activities | Typical Duration | Tasks Performed |
| --- | --- | --- |
| C-SLA Identification | 1 ATP | Identify SATW s |
| | | Identify O-CSLAs |
| Regionalization | 1 ATP | Identify SLSCs and |
| | | VLSCs for CSLAs |
| Model Selection | For every $DTP_i$ | Identify AIs |
| | over n | Identify for each |
| | successive ATPs | AI $BFM_h$ and $BFM_v$ |
| HUB Computation | For every $DTP_i$ | Compute UUBs for |
| | | N-CSLA set |
| | over n | Compute HUBs |
| | successive ATPs | for CSLAs |

Sample Scenarios:

ATP: n weeks, 1 week spanning the interval, SUN 00:00 hrs-SAT 23:59 hrs $DTP_i$: sub-period of ATP, where i corresponds to different days of the week. (ATP)

ATW: time-period divisions within 1 ATP

The sequence diagrams depicted in FIG. D and FIG. E represent the interaction between the offline and online components at ATP and DTP intervals. FIG. D—Sample Scenario—1 depicts the sequence of activities that take place at the end of the ATP. FIG. E—Sample Scenario—2 depicts the sequence of activities that take place during a given $DTP_i$ in the ATP.

Thus, a system and method for CSLA Identification based on bandwidth and near-optimal traffic analysis for forecasting BW-related CSLA operator violations at a future time point has been disclosed. Although the present invention has been described particularly with reference to the figures, it will be apparent to one of the ordinary skill in the art that the present invention may appear in any number of systems that predict SLA violations by near-optimal monitoring of an SLA parameter. It is further contemplated that many changes and modifications may be made by one of ordinary skill in the art without departing from the spirit and scope of the present invention.

ACRONYM LIST:

| | | |
| --- | --- | --- |
| 1. | ASP | ALARM SET POINT |
| 2. | AI | ANALYSIS INTERVAL |
| 3. | AMC | ALARM MONITOR COMPONENT |
| 4. | AT | ACKNOWLEDGEMENT TIME |
| 5. | ATP | ANALYSIS TIME PERIOD |
| 6. | ATPP | ASP TIME POINTS OF PREDICTION |
| 7. | ATW | ANALYSIS TIME WINDOW |
| 8. | BFM | BEST FIT MODEL |
| 9. | BW | BANDWIDTH |
| 10. | CI | COMBINED INTERVAL |
| 11. | CSLA | CRITICAL SLA |
| 12. | DTP | DAILY TIME PERIOD |
| 13. | EL | ESCALATION LEVEL |
| 14. | FM | FORECAST MODEL |
| 15. | HUB | HARD UPPER BOUND |
| 16. | LME | LEAST MERGE ERROR |
| 17. | MCF | MASTER CLOCK FREQUENCY |
| 18. | M-CSLA | MANUAL CSLA |
| 19. | MN | MASTER NODE |
| 20. | MNP | MASTER NODE PROBE |
| 21. | MTTR | MEAN TIME TO REPAIR |
| 22. | MW | MODEL WINDOW |
| 23. | NASP | NUMBER OF ASP'S |
| 24. | N-CSLA | NEW CSLA |
| 25. | NWC | NETWORK CAPACITY |
| 26. | O-CSLA | OPTIMAL CSLA |
| 27. | OL | OVERLOAD |
| 28. | OMS | OVERLOAD MONITORING SYSTEM |
| 29. | OVA | OPERATOR VIOLATION ALARM |
| 30. | SATW | SENSITIVE ANALYSIS TIME WINDOW |
| 31. | SCF | SLAVE CLOCK FREQUENCY |
| 32. | SFM | SUITE OF FORCASTING MODELS |
| 33. | SLSC | SIMILAR LOAD SUB-CLUSTER |
| 34. | SN | SLAVE NODE |
| 35. | SNP | SLAVE NODE PROBE |
| 36. | SRN | SLA RECOVERY NOTIFICATION |
| 37. | SUB | SOFT UPPER BOUND |
| 38. | SV | SLA VIOLATION |
| 39. | TBOL | TIME BEFORE OVERLOAD |
| 40. | TTPP | TBOL TIME POINTS OF PREDICTION |
| 41. | UNP | UNIVERSAL NETWORK PROBE |
| 42. | UUB | USAGE UPPER BOUND |
| 43. | V-CSLA | VIOLATION CSLA |
| 44. | VLSC | VARIABLE LOAD SUB-CLUSTER |
| 45. | X-SLA | NON-CRITICAL SLA |

What is claimed is:

1. A method for supporting a near-optimal overload monitoring of a network, said network comprising a plurality of nodes, in order to minimize service level agreement (SLA) violations due to a plurality of SLAs (service level agreements) by monitoring only a plurality of critical SLAs in a plurality of master nodes, wherein each critical SLA of said plurality of critical SLAs is part of said plurality of SLAs, each node of said plurality of master nodes is part of said plurality of nodes of said network, the number of SLAs in said plurality of critical SLAs is less than the number of SLAs in said plurality of SLAs, and the number of nodes in said plurality of master nodes is less than the number nodes in said plurality of nodes, the said method comprising:

receiving said plurality of SLAs;

computing of a plurality of SLA-specific load vectors based on said plurality of SLAs with respect to said network over a plurality of predefined time intervals;

computing of a plurality of sensitive analysis time intervals (SATWs) associated with said plurality of SLAs based on said plurality of SLA-specific load vectors, wherein each of said plurality of SATWs is part of said plurality of predefined time intervals and an aggregate load based on said plurality of SLA-specific load vectors exceeds a predefined threshold;

computing of a plurality of SATW-specific optimal weights associated with said plurality of SLAs with respect to an SATW of said plurality of SATWs;

determining of said plurality of critical SLAs, wherein each of said plurality of critical SLAs is part of said plurality of SLAs, based on said plurality of SATW-specific optimal weights, said plurality of SATWs, and said plurality of SLAs;

clustering of said plurality of network nodes based on a hop metric, wherein said hop metric with respect to a node 1 of said plurality of nodes and a node 2 of said plurality of nodes is a measure of number of hops that separates said node 1 and said node 2 in said network, into a plurality of hop based contiguous clusters;

identifying a plurality of SLA-specific clusters for an SLA of said plurality of critical SLAs based on said plurality of hop based contiguous clusters;

computing of a plurality of SLA-specific similar load subclusters based on said plurality of SLA-specific clusters and said SLA;

computing of a plurality of level-wise clusters based on said plurality of SLA- specific similar load subclusters;

identification of a plurality of SLA-specific master nodes for monitoring of said network for any violations with respect to said SLA based on said plurality of level-wise clusters; and identification of said plurality of master nodes, wherein each SLA-specific master node of said plurality of SLA-specific master nodes for each SLA of said plurality of critical SLAs is part of said plurality of master nodes.

2. The method of claim 1, wherein said method of computing of an SLA-specific load vector of said plurality of SLA-specific load vectors further comprising: computing of an aggregate load due to a Service Level Agreement (SLA) of said plurality of SLAs over a said plurality of predefined time intervals, wherein the load due to said SLA corresponds with said SLA-specific load vector, and computing of said SLA-specific load vector based on said aggregate load.

3. The method of claim 1, wherein said method of computing said plurality of SATW-specific optimal weights further comprising:

identifying of said plurality of SATW-specific optimal weights ($X1, X2, \ldots, Xi, \ldots Xs$) associated with said plurality of SLAs ($SLA1, SLA2, \ldots, SLAi, \ldots SLAs$) for said SATW with an optimal weight $Xi$ of the plurality of optimal weights associated with $SLAi$ of said plurality of SLAs, wherein said identification comprises:

computing of a plurality of average Loads ($B1, B2, \ldots, Bi, \ldots, Bs$) associated with said plurality of SLAs ($SLA1, SLA2, \ldots, SLAi, \ldots SLAs$)

computing of a plurality of maximum difference between consecutive peaks ($\Delta 1, \Delta 2, \ldots, \Delta 1, \ldots, \Delta s$) in said SATW for said plurality of SLAs ($SLA1, SLA2, \ldots, SLAi, \ldots SLAs$)

computing of an overall capacity (1) of said network NW: and minimizing of sum of said plurality of SATW-specific optimal weights ($X1, X2, \ldots, Xi, \ldots, Xs$), ensuring a sum of($Bi*Xi$) over said plurality of optimal weights ($X1, X2, \ldots, Xi, \ldots, Xs$) and said plurality of average loads ($B1, B2, \ldots, Bi, \ldots, Bs$) to be greater than L, ensuring ($Bi*Xi-Bi$) to be greater than or equal to 0 and less than or equal to $\Delta I$ for each of said plurality of average loads, ($B1, B2, \ldots, Bi, \ldots, Bs$) and each of said plurality of optimal weights ($X1, X2, \ldots, Xi, \ldots, Xs$).

4. The method of claim 1, wherein said method of determining said plurality of critical SLAs further comprising:

computing of a plurality of SLA-specific aggregate weights based on said plurality of SATW-specific optimal weights associated with said plurality of SLAs and said plurality of SATWs ranking of said plurality of SLAs based on said plurality of SLA-specific aggregate weights to form a plurality of ranked SLAs; and selecting of a predefined number of SLAs from said plurality of ranked SLAs as said plurality of critical SLAs.

5. The system method of claim 1, wherein said method of identifying said plurality of SLA-specific clusters further comprising:

obtaining a node of a cluster of said plurality of hop-based contiguous clusters;

obtaining a load vector due to said SLA with respect to said node; and making said node a part of a cluster of said plurality of SLA-specific clusters if said load exceeds a predefined threshold, wherein said cluster of said plurality of SLA-specific clusters corresponds to said cluster of said hop-based contiguous clusters.

6. The method of claim 1, wherein said method of computing said plurality of SLA-specific similar load subclusters further comprising:

obtaining a node of a cluster of an SLA-specific cluster of said plurality of SLA-specific clusters;

obtaining an SLA-specific load vector for said SLA associated with said node; computing a correlation of said node with an SLA-specific similar load subcluster of said plurality of SLA-specific similar load subclusters based on said SLA-specific load vector; and making said node a part of said SLA-specific similar load subcluster if said correlation exceeds a predefined threshold.

7. The method of claim 1, wherein said method of computing a second level cluster of said plurality of level-wise clusters further comprising:

obtaining a granularity level associated with said second level cluster of said plurality of level-wise clusters;

obtaining a plurality of level-wise aggregate time intervals based on said predefined time intervals and said granularity level, wherein each level-wise aggregate time interval of said plurality of level-wise aggregate time intervals is an aggregate of a predefined time interval of said plurality of predefined time intervals;

obtaining a node of an SLA-specific similar load subcluster of said plurality of SLA-specific similar load subclusters;

obtaining a second level SLA-specific load vector for said SLA associated with said node based on said plurality of SLA-specific load vectors and said plurality of level-wise aggregate time intervals;

computing of a correlation of said node with said second level cluster based on said second level SLA-specific load vector; and making said node a part of said second level cluster if said correlation exceeds a predefined threshold.

8. The method of claim 1, wherein said method of computing a level-wise cluster of said plurality of level-wise clusters further comprising:

obtaining a granularity level associated with said level-wise cluster of said plurality of level-wise clusters;

obtaining a plurality of clusters associated with a level one less than said granularity level;

obtaining a plurality of level-wise aggregate time intervals based on said predefined time intervals and said granularity level, wherein each level-wise aggregate time interval of said plurality of level-wise aggregate time intervals is an aggregate of a predefined time interval of said plurality of predefined time intervals;

obtaining a node of a cluster of said plurality of clusters;

obtaining a level-wise SLA-specific load vector for said SLA associated with said node based on said plurality of SLA-specific load vectors and said plurality of level-wise aggregate time intervals;

computing a correlation of said node with said level-wise cluster of said plurality of level-wise clusters based on said level-wise SLA-specific load vector; and making said node a part of said level-wise cluster if said correlation exceeds a predefined threshold.

9. The method of claim 1, wherein said method of identification of said plurality of SLA-specific master nodes further comprising:

obtaining a cluster of said plurality of level-wise clusters;

determining of a node of said cluster, wherein said node is the centroid of said cluster; and making said node a part of said plurality of SLA-specific master nodes.

10. The method of claim 1, wherein said method of identification of said plurality of master nodes further comprising:

identifying a variable load subcluster based on said plurality of SLA-specific master nodes associated with each SLA of said plurality of critical SLAs and said plurality of nodes of said network;

determining of a node of said variable load subcluster, wherein said node is a randomly selected node from said variable load subcluster; and making said node a part of said plurality of master nodes.

* * * * *